United States Patent
Hylbert et al.

(10) Patent No.: US 12,209,933 B2
(45) Date of Patent: Jan. 28, 2025

(54) WELDMENT TEST SYSTEM

(71) Applicant: ULTRA CLEAN HOLDINGS, INC, Hayward, CA (US)

(72) Inventors: Jon Hylbert, Los Gatos, CA (US); Ross Keiser, Hutto, TX (US); Matthew Milburn, Felton, CA (US)

(73) Assignee: ULTRA CLEAN HOLDINGS, INC., Hayward, CA (US)

( * ) Notice: Subject to any disclaimer, the term of this patent is extended or adjusted under 35 U.S.C. 154(b) by 343 days.

(21) Appl. No.: 17/589,531

(22) Filed: Jan. 31, 2022

(65) Prior Publication Data
US 2022/0244132 A1 Aug. 4, 2022

Related U.S. Application Data

(60) Provisional application No. 63/144,008, filed on Feb. 1, 2021.

(51) Int. Cl.
*G01M 3/28* (2006.01)
*B08B 9/02* (2006.01)
(Continued)

(52) U.S. Cl.
CPC ........... *G01M 3/2853* (2013.01); *B08B 9/021* (2013.01); *B08B 9/0325* (2013.01);
(Continued)

(58) Field of Classification Search
CPC .... G01M 3/2853; G01M 3/223; G01M 3/225; G01M 3/2884; B08B 9/021; B08B 9/0325; B08B 9/0328
See application file for complete search history.

(56) References Cited

U.S. PATENT DOCUMENTS

| | | | |
|---|---|---|---|
| 5,197,324 A | 3/1993 | Keys | |
| 5,715,612 A * | 2/1998 | Schwenkler | F26B 21/145 |
| | | | 34/493 |
| 2009/0315197 A1* | 12/2009 | Hsieh | H01L 21/67034 |
| | | | 261/130 |

FOREIGN PATENT DOCUMENTS

| | | | | |
|---|---|---|---|---|
| JP | 3983015 B2 * | 9/2007 | ....... | H01L 21/67028 |
| TW | 200305463 A | 11/2003 | | |
| TW | 200738362 A | 10/2007 | | |

OTHER PUBLICATIONS

JP-3983015-B2, English translation (Year: 2007).*

(Continued)

*Primary Examiner* — Ryan D Walsh
(74) *Attorney, Agent, or Firm* — Patterson + Sheridan, LLP

(57) ABSTRACT

A fluid test system for checking the integrity of connections and welds in a fluid component includes a first nitrogen source selectively connected to first and second isopropanol tanks, a fluid line circulation circuit, a drain selectively connected to the fluid circulation line, the first IPA tank connected to the fluid line circulation circuit through a first IPA line and a second IPA tank connected to the fluid line circulation circuit through a second IPA a second drain selectively connected to the first and second IPA tanks, a first deionized water line selectively connectable to a deionized water source and to the fluid line circulation circuit, and a vacuum pump selectively connectable to the fluid line circulation circuit through a vacuum selection valve, wherein the fluid line circulation circuit is selectively configurable to flow water, nitrogen and IPA through a unit under test.

16 Claims, 14 Drawing Sheets

(51) Int. Cl.
  *B08B 9/032* (2006.01)
  *G01M 3/22* (2006.01)
(52) U.S. Cl.
  CPC ........... *B08B 9/0328* (2013.01); *G01M 3/223* (2013.01); *G01M 3/225* (2013.01); *G01M 3/2884* (2013.01)

(56) References Cited

OTHER PUBLICATIONS

1 PCT/US2022/070443, International Search Report and Written Opinion dated Jul. 5, 2022, 18 pages.
Taiwan Patent Application No. 111104306, Office Action and Search Report dated Apr. 7, 2023, 12 pages.

* cited by examiner

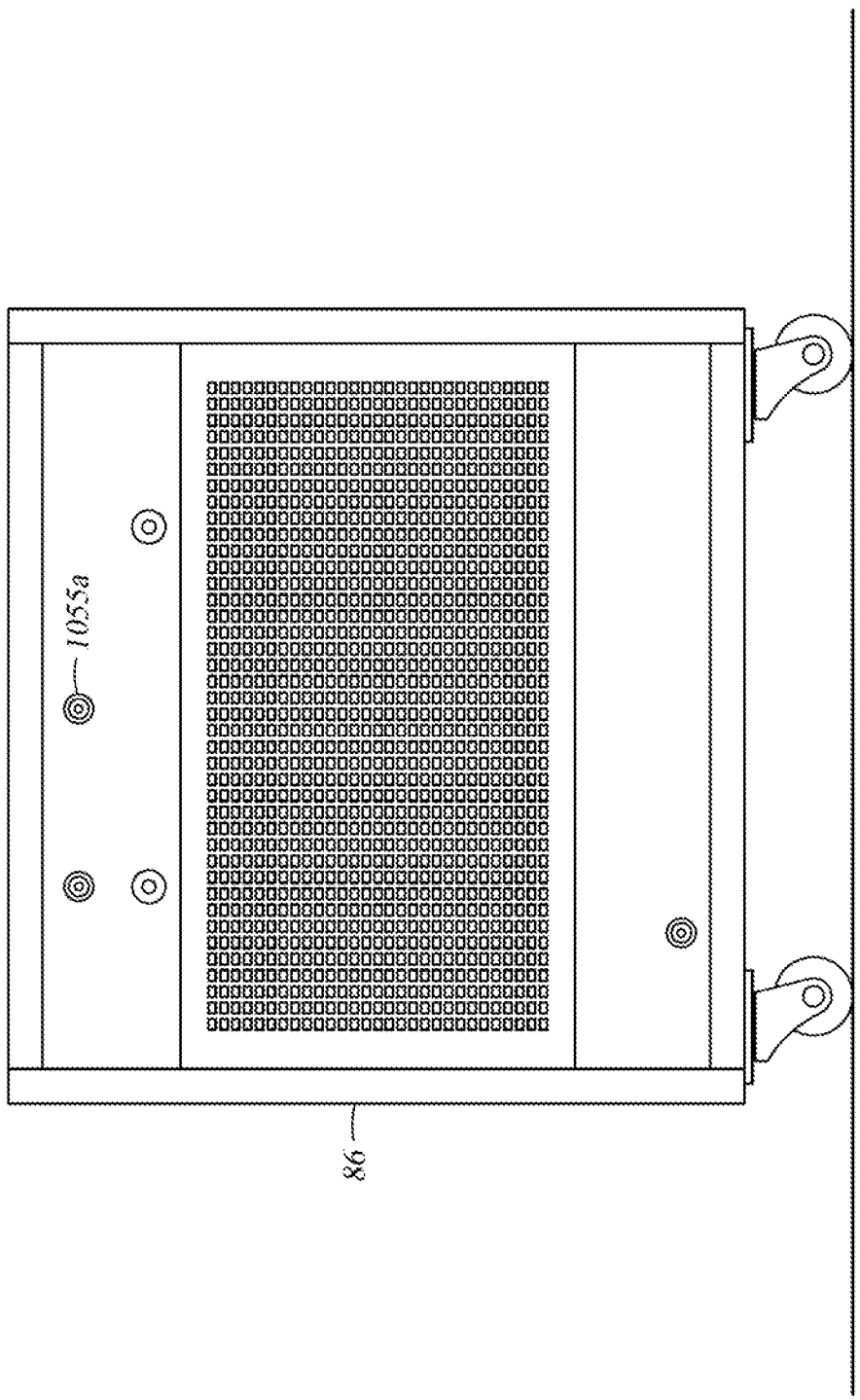

US 12,209,933 B2

WELDMENT TEST SYSTEM

CROSS-REFERENCE TO RELATED APPLICATIONS

This application claims benefit of U.S. provisional patent application Ser. No. 63/144,008, filed Feb. 1, 2021, which is herein incorporated by reference.

BACKGROUND

Field

The present disclosure relates to the field of weldments employed in process piping, for example weldments used to connect a threaded connector to a length of tubing, and more particularly to the cleaning and testing of weldments and connections for pressure and vacuum integrity

Description of the Related Art

Process piping or tubing is used in a multitude of industries to deliver process fluids to process equipment, for example, equipment used to form film layers on, or to remove material or film layers from, semiconductor and other materials surfaces, Such process piping is also employed in equipment used to expose film layers using electromagnetic energy passing through a mask, and also in equipment used for patterned material removal. The process gasses used to deposit film layers using chemical vapor deposition, or to etch material film layers or an underlying substrate surface, are often at least one of corrosive, pyrophoric, explosive or poisonous. These gasses are supplied to a process device through tubing cut and/or bent to a desired length and routed in a customized way, which tubings are welded or otherwise interconnected at the individual tubing ends to one of a male half, or female half, of a fitting connection. These male and female fitting halves are then used to connect to a corresponding and mating male or female half of a fitting on an additional tubing end or to a corresponding and mating male or female half of a fitting on a piece of process equipment, a gas panel, a factory gas supply line, a gas bottle, a bubbler or evaporator, or other such connection. One such fitting configuration is a VCR connection available from Swagelok®, where the female half of the fitting includes a threaded bore, and the male half of the fitting includes a mating threaded boss and a through bore. A pair of tubing stubs, each including a tubular portion configured to be welded or otherwise connected in a fluid sealed manner to a section of process tubing at one end thereof and an enlarged annular sealing face at the opposed end of the thereof, are also provided. The tubular portions of the tubing stubs are extended through the openings in the male and female portions, such that when the male and female portions are threaded together, the annular sealing faces are adjacent to and facing one another within the fitting. A sealing gasket may also be provided between the annular sealing faces to form a sealed connection. Another such fitting configuration is one in which tubes having KF style or bolted flange style connections where the flange types are symmetrical and utilize a gasket preloaded with bolts or a clamp. Additional connections or fittings are known, where a fitting or connection portions which interconnect are connected to tubes, and the tubes welded to sections of other tubing to make up a fluid circuit.

Because the process pipings, comprising a length of process tubing and a male or female half, or a symmetrical flange type of a fitting connected on at least one end thereof, carry fluids which may be corrosive, pyrophoric, explosive or poisonous, the process pipings must be tested to ensure that they are leak tight. This includes testing of the process pipings in a standalone state, to ensure that leakage is not occurring at the location where a tubing stub or other fitting element has been welded to a length of tubing to make up a process piping. In other words, they must be tested to ensure that the fluids carried therein cannot leak outwardly thereof and into a factory environment or within equipment in the factory where the process pipings have been installed. Likewise, where the process pipings are to be used in high pressure applications to flow a fluid therein or therethrough which is maintained at a relatively high pressure, they must also be pressure tested to ensure that the connection of the tubing stubs or other elements of the male and female halves of the fittings to a tubing and/or any welded joints do not leak or fail when exposed to the high pressure. However, the handling of these process pipings during the cleaning and testing thereof is believed to be a cause of damage which could result in leaking or failing of the mechanical sealing connection of the tubing stubs or other elements of the fitting halves to the tubing ends to which they are connected, such as by welding or other sealing mechanism.

SUMMARY

An integrated cleaning and test system includes a first connector configured to connect to a first mating connection of a process tubing, a second connector configured to connect to a second mating connection on the process tubing, a first fluid test device operatively connectable to one of the first and second connectors, a first source of fluid operatively connectable to one of the first and second connectors, a second source of fluid operatively connectable to one of the first and second connectors and a testing circuit comprising a plurality of testing piping and valves, the valves selectively positionable to selectively place one of the first fluid test device, the first fluid source, or the second fluid source in fluid communication with one of the first and second connectors, whereby each of the first fluid test device, the first fluid source or the second fluid source are in fluid communication with one of the first and second connecter in a user selectable sequence to enable the system to test, clean, and dry a process tubing without requiring that the process piping be removed from the system between any of the testing, cleaning, or drying steps.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 2C is a rearview of a portion of the piping test device of FIG. 1.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Provided herein is a piping fluid test device for testing, cleaning, and drying process piping including lengths of tubings connected to fittings such as by welding of the ends of the piping to corresponding portions of the fittings. In the aspect thereof shown in FIG. 1, the device is configured as a test cabinet 100 to which one or more process pipings are connectable, and each of the process pipings are evaluated for vacuum integrity, including weldment vacuum integrity, and if desired, for high pressure fluid integrity, i.e., the weldment does not leak when the interior of the process piping is at high pressure. A testing fluid circuit is provided, at least in part within the cabinet, which is selectively configurable to expose the interior of a process piping, herein a "unit under test", to vacuum, to a high fluid pressure if desired, and to a cleaning agent such as isopropyl alcohol, drying agent such as a dry heated gas, for example dry heated nitrogen or $N_2$. When the interior of the unit under test is exposed to vacuum, a leak checking gas can be introduced to the exterior of the weld joint(s) of the unit under test, and the testing fluid circuit configured to allow the leak checking gas, if passing through the weld joint(s) and into the interior of the unit under test, to a helium detector. The testing fluid circuit is user configurable, using a computer or other user addressable logic device, to selectively open and close valving therein to form sub circuits of the fluid testing circuit to selectively cause the interior of the unit under test to be exposed to vacuum, high pressure, cleaning fluid, and drying fluid, in any user desired sequence.

Figure 1:
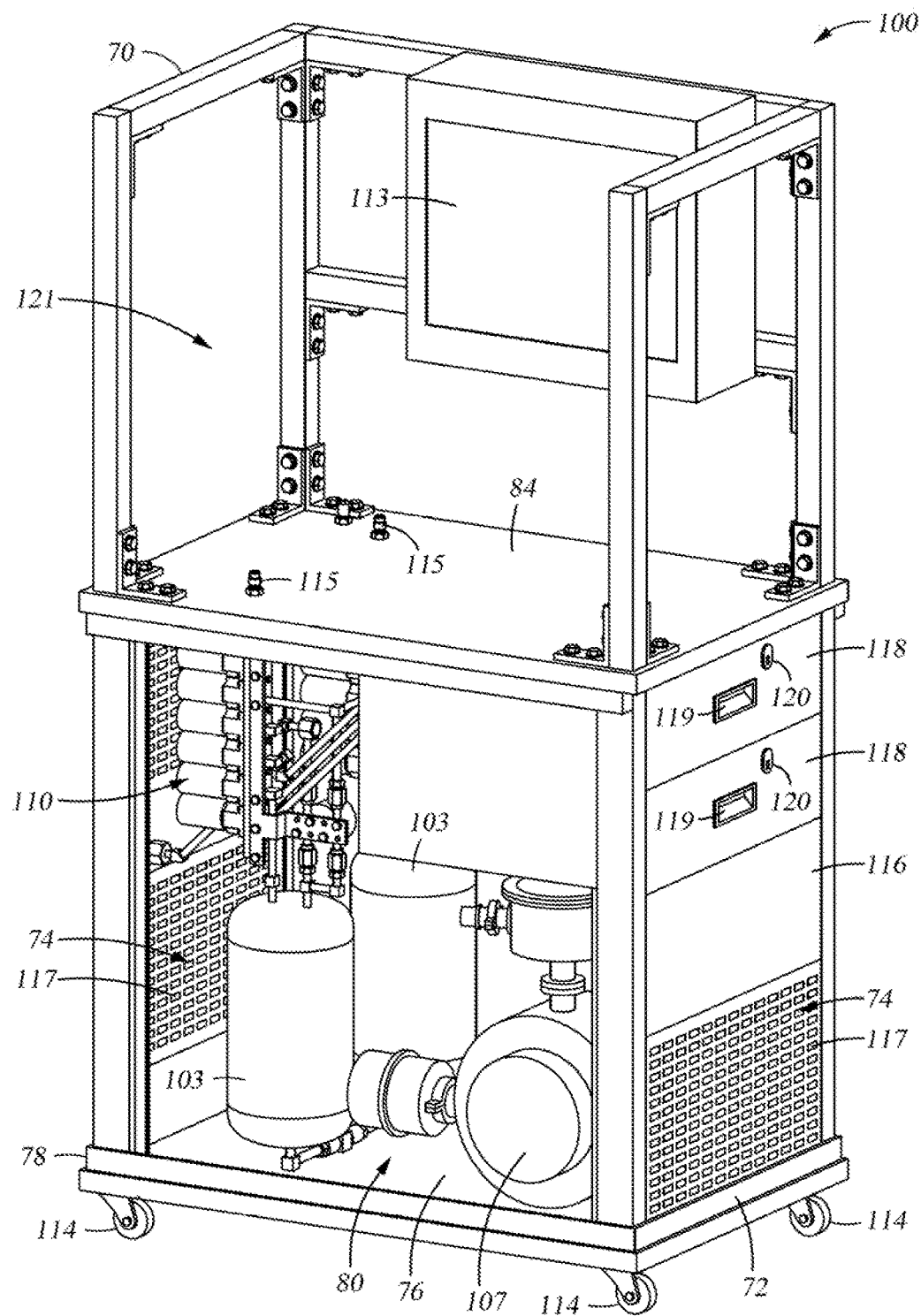
FIG. 1 is an isometric view of an example piping test device or cabinet provided for testing of weldments for pressure and vacuum, i.e., non-leakage, integrity.

Referring initially to FIG. 1, an isometric view of an integrated weldment test cabinet 100 capable of testing and thereafter cleaning process pipings, hereinafter "units under test" 1066 (FIGS. 2A and 2B), is depicted. The integrated weldment test cabinet 100 is here configured to enable connection of the fitting halves on the ends of a unit under test to be connected thereto, and, to perform one or more evaluations or tests upon the unit under test 1066. For example, the cabinet 100 can be used to perform automated leak testing of a unit under test 1066 using helium, and thereafter the flushing and drying of the inner surfaces of the unit under test 1066 before, after, or before and after the leak testing of the unit under test 1066. Additionally, pressure testing of the unit under test 1066 at a pressure greater than the surrounding ambient in addition to, or alternatively to, the vacuum tasting thereof, is also possible using the cabinet 100.

Here, cabinet 100 includes a cabinet shell 116 comprising a steel or other metal frame 70, and is configured as a rectangular prism with lower enclosure 80 bounded by skins 72 connected to the frame 70 by threaded fasteners or other securement elements. The cabinet 100 includes at least two ventilation openings 117 extending through the skins 72, each covered in a screen 74, one each on opposed sides of the cabinet 100, an upper cabinet surface 84, and a lower equipment base 76 within the lower enclosure 80. A user interface compartment 121 extends over the upper cabinet surface 84 within the inner boundary of the frame 70. The lower enclosure 80 is further bounded by a skin forming a rear panel 86 (FIG. 2C), through which facilities fluids for testing, such as DI water, isopropyl alcohol (IPA), helium and nitrogen can be supplied into the lower enclosure 80 to be used for testing a unit under test 1066 using the cabinet 100. Facility lines, independent bottles, or a combination of both may supply these facilities. The cabinet 100 is connected, at each of the four corners thereof at the lower end 78 of the frame 70, to a castor or lockable wheel 114 (only three shown), to enable movement of the cabinet 100 as well as for locking or securing of the cabinet 100 in a desired location against movement thereof.

The lower enclosure 80 of the cabinet 100 includes a plurality of drawers 118 accessible from the exterior of the lower enclosure 80, here two, each with drawer handles 119 and locks 120, for housing tools such as wrenches, unit adaptors 201 (FIG. 2) and other paraphernalia used in the testing of units under test. Within the remainder of the lower enclosure 80 are a plurality of fluid tanks 103, here two, each capable of receiving, storing, and dispensing cleaning agent such as isopropyl alcohol (IPA stored in a liquid state), as well as a vacuum pump 107 and a pair of pipe openings 115 at the ends of a pair of pipings, here at the ends of C-seal surface mount valves or manifolds, all of which are fluidly interconnectable to a plurality of testing pipings 110, here sections or lengths of stainless steel or other piping having clean smooth internal surfaces which are inert to the fluids to be flowed therethrough during testing. Additional fluid components, as will be described later herein, are present in the lower enclosure and connected to selected ones of the testing pipings 110. A plurality of valves, as will be discussed later herein, are also located within the lower enclosure 80 and interconnect selected ones of the testing pipings 110 and the vacuum pump 107, fluid tanks 103 and an optional high pressure test system 1063 (FIGS. 3, 4) to form a piping fluid test circuit. The piping fluid test circuit is configurable to form individual configurable fluid circuits for conducting one or more test operations or procedures on a unit under test 1066 being evaluated using the cabinet 100.

Figure 2A:
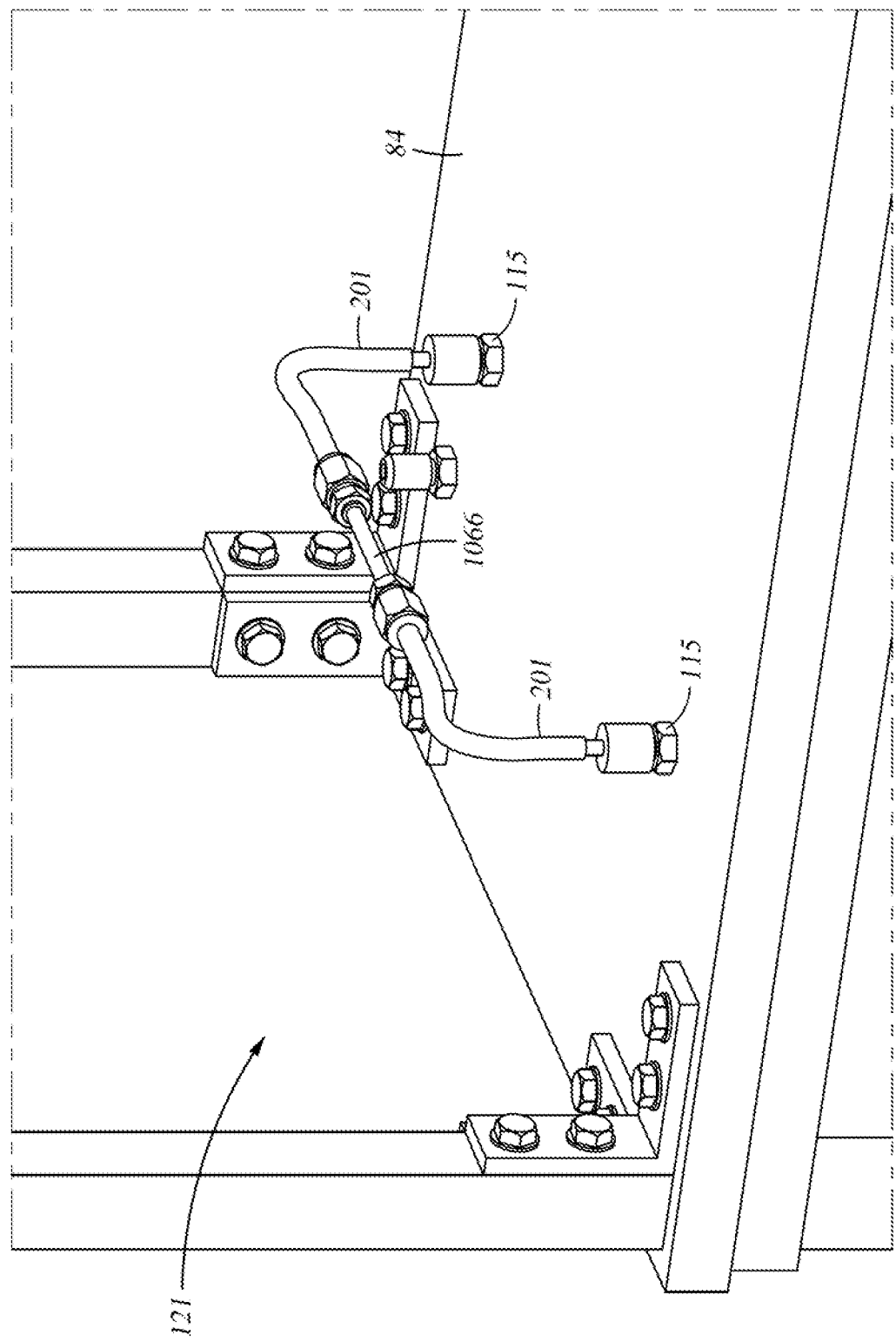
FIG. 2A is an enlarged isometric view of a portion of the piping test device of FIG. 1, here showing pipe openings extending upwardly through a lower base of an upper portion of the cabinet.
Figure 2B:
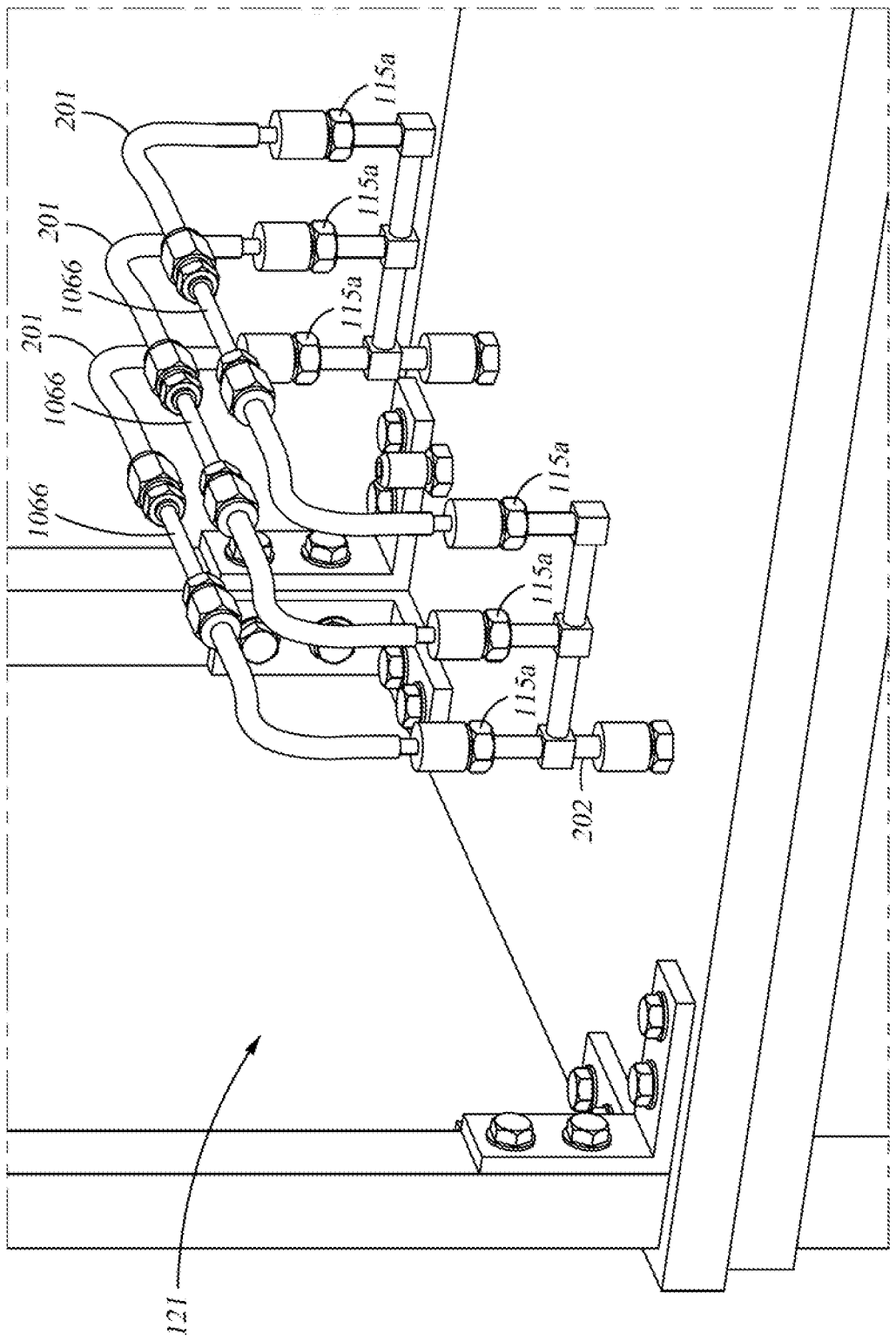
FIG. 2B is an enlarged isometric view of a portion of the piping test device of FIG. 1, here showing a pair of manifolds included for testing multiple process pipings, each connected to one of the pipe openings.
Figure 3:
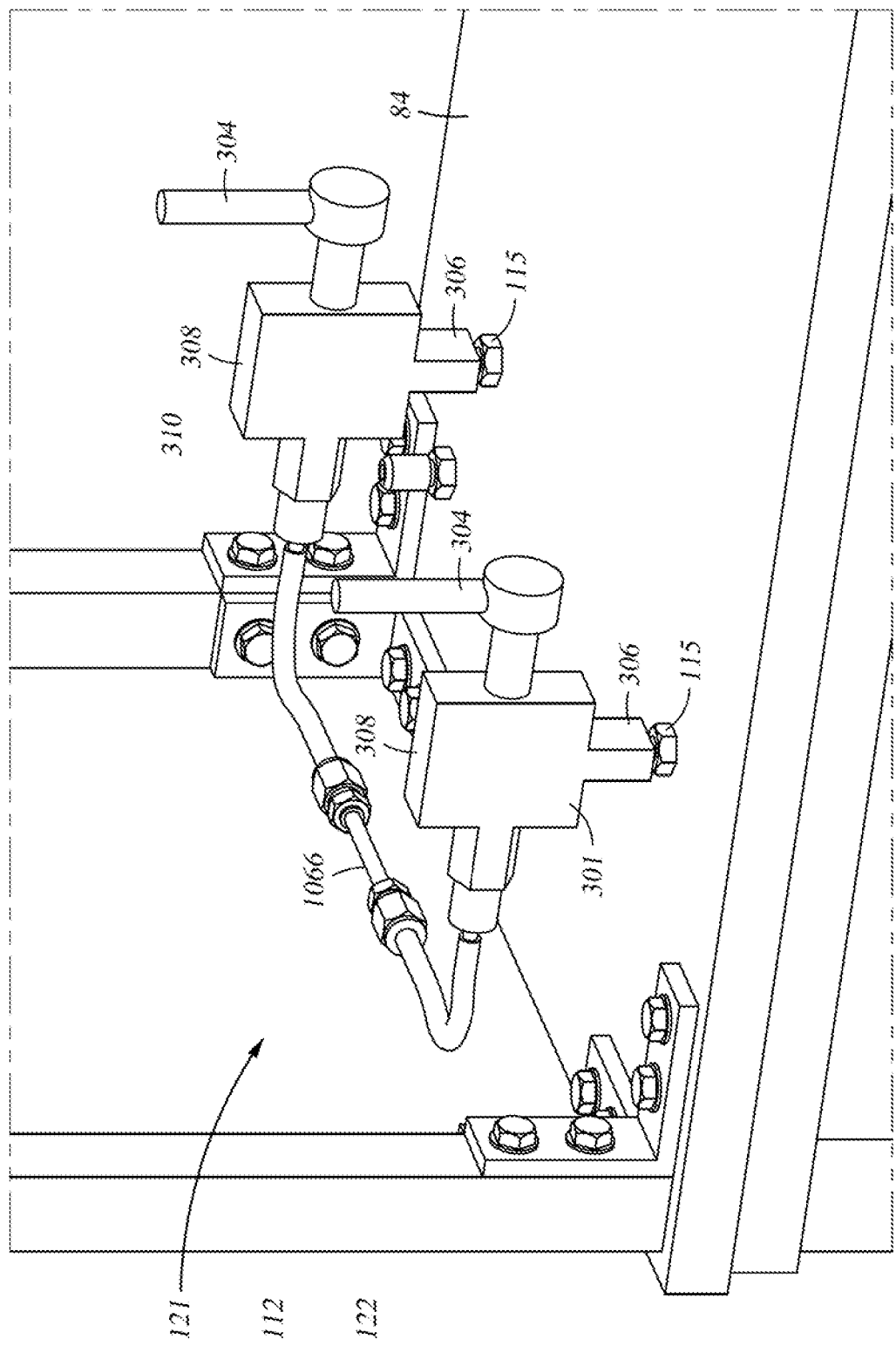
FIG. 3 is an enlarged isometric view of a portion of the piping test device of FIG. 1, here showing high pressure isolating valves for hydrostatic pressure testing of weldments connected to one of the pipe openings.

The piping fluid test circuit includes testing pipings 110 to which a unit under test 1066 is to be attached. These testing pipings 110 include the pair of pipe openings 115 at the ends of the pair of pipings which extend outwardly of the lower enclosure 80 and through the upper cabinet surface 84, with a space therebetween sufficient to allow a unit under test 1066, to be connected between and across the two pipe openings 115 as shown in FIGS. 2a and 2b. The terminal ends of the piping having the pipe openings 115 are located approximately 2 to 10 cm above the upper cabinet surface 84 within the user interface compartment 121 of the cabinet 100. The region of the cabinet 100 above the upper cabinet surface 84 forms a user interface compartment 121 which a user of the cabinet 100 is capable of accessing in order to attach a unit under test 1066 across the pipe openings 115. Adaptors may be connected to the opposed fitting halves on the opposed ends of the unit under test 1066, to connect to the pipe openings 115 such that the unit under test 1066 provides an enclosed fluid pathway between the pair of pipe openings 115. Additionally a separate high-pressure test unit for supplying a high-pressure fluid within the flow passage of a unit under test 1066 can be separately connected to the pipe openings 115 when high pressure isolation valves 301 are connected to the cabinet 100, and the unit under test 1066 connected thereto as shown in FIG. 3.

A graphical user interface (GUI) is connected to the portion of the frame 70 of the cabinet above the rear panel 86. The graphical user interface 113 connects to and, or, resides over, the top of a computer and/or programmable logic controller (PLC) capable of directing the graphical user interface 113 to display test configurations and properties, receiving user instructions concerning test configurations, properties or recipe, and outputting, as well as storing, test results associated with a specific unit under test, and control the operation of the components and valves within the lower enclosure 80 of the cabinet and any high pressure test unit, where used, to execute a test on a unit under test 1066. For example, each unit under test 1066 may include a unique identifier, such as a code or bar code thereon, and this code is entered into the computer through a scanner (not shown) or manually by a user of the cabinet 100 through the GUI, and the computer controls the operation of the valves and other components in the lower enclosure 80 to perform a series of procedures either preprogrammed by a user or owner of the of the cabinet 100 based on the code of the unit under test, or as specifically differently entered through the graphical user interface for the specific unit under test 1066.

Referring now to FIGS. 2A and 2B, an isometric view of a portion of the user interface compartment 121 with a plurality of unit adaptors 201 capable of fluidly connecting together the pipe openings 115 and a unit under test 1066 is shown. In one aspect, the unit adaptor is a high-pressure stainless steel tubing with integral fitting halves formed on the opposed ends thereof and rated to withstand the pressures at which hydrostatic testing of the unit under test 1066 is performed. Here, the unit adaptor may be flexible, and reusable for a number of different types of units under test having different tubing lengths, but the same size fitting halves.

In another aspect, the unit adaptor 201 comprises a stainless steel tube having opposed fitting halves thereon, one fitting half configured as a female fitting half to couple to one of the pipe openings 115, and the other fitting half being male or female half to couple to the mating fitting half on one of the ends of the unit under test 1066, both couplings connected in a fluid tight manner, to connect the unit under test 1066 between and across the pipe openings 115 to enable fluid flow of liquids and gasses therethrough or thereinto under control of the computer, or manual control. In this aspect, the unit adaptors 201 are custom manufactured based on the spacings between the pipe openings 115 and the locations and types of the fittings on a specific configuration of a unit under test 1066, such that the unit adaptors 201 are customized to a specific unit under test 1066, and each unit under test 1066 requires a specific set of unit adaptors 201, which may be reused to connect another unit under test 1066 of the same type to the pipe openings 115. In this aspect, the fitting halves of the unit adaptors 201 are first connected to the fitting halves on opposed ends of a unit under test 1066, and thence the female fitting halves on the other ends of the unit adaptors are connected to the pipe openings 115 configured as a male fitting half to connect the unit under test 1066 between and across the pipe openings 115. Here, for the unit under test 1066 shown in FIGS. 2A and 2B, the unit adaptors 201 each comprise a length of tubing with a 90° bend in it so that one end of the length of tubing connected to a pipe opening 115 extends generally parallel to and collinearly with the portion of the pipe extending from the upper cabinet surface 84 and terminating in a pipe opening 115, and the second end of the tubing connected to a fitting on the unit under test 1066 is generally parallel with the upper cabinet surface 84. Additionally, a unit under test 1066 may include more than two fitting halves therein. For example, the unit under test may include one or more branches emanating from one or more connection locations having additional tubings and associated fitting halves. In order to test these units under test 1066, the fitting halves in excess of two are connected to blind mating fitting halves, i.e. fitting halves which fluidly connect only to a closed or blind bore therein so that fluid can enter, but not flow through, any length of piping on the downstream side of the blind fitting halve.

Where different fitting configurations are present on the unit under test, the fitting half of the unit adaptor 201 is selected for the proper size of the fitting half on the unit under test 1066. In one embodiment as shown in FIG. 2A, the unit adaptor 201 is fastened directly to the piping at the openings 115 and to a unit under test 1066, and the cabinet 100 is configured to test one unit under test 1066 at a time. In a second embodiment, a second or greater number of pairs of pipe openings 115, and corresponding unit adapters 201, are provided. In FIG. 2B, this is provided by a pair of adaptor manifolds 202, each connected to a plurality of, here three, pipe openings 115 through adaptor manifold pipe openings 115a connected to a central common manifold, the central common manifold of each adaptor manifold connect to one of the pipe openings 115. The adaptor manifolds 202 allow for multiple units under test 1066 to be simultaneously tested on or in the cabinet.

The cabinet 100 is herein configured for automated cycling of fluids through a unit under test 1066. However, manual operation is also contemplated. Specifically, where only a portion of the units under test 1066 need to be tested for high-pressure weldment integrity, the high pressure testing equipment need not be located within the lower enclosure 80 of the cabinet 100, but is provided over the pipe openings 115. Referring to FIG. 3, an isometric view of the user interface compartment 121 with a pair of hydrostatic test valves 301 to connect to an external high pressure testing device is shown. Each hydrostatic test valve includes a valve body 302 having a connection end 306 threaded to a corresponding one of the pipe openings 115, a manual operations lever 304 operatively connected to the valve body 302 to allow the opening and closing of a flow passage through the valve body 302, and a secondary pipe opening 115 for connection thereto of a unit connector connected to a unit under test 1066. One of the hydrostatic test valves 301 also includes a high-pressure fluid inlet 308 for connection of a high pressure fluid line thereto. During the high pressure testing of the unit under test, the fluid is deadheaded, i.e., the high pressure fluid, here water is flowed to fill the portions of the testing pipings 110 used for hydrostatic testing, and then a valve to the drain is closed, allowing the fluid pressure to increase within the process pipings 110 and the unit under test, up to the desired test pressure. A unit under test 1066, with corresponding unit adapters 201 capable of fitting to the unit under test 1066, is shown, where the female ends of the unit adaptors 201 are connected to the secondary pipe openings 115'. Additionally, each hydrostatic test valve 301 may include a solenoid operator, which replaces the manual operations lever 304 thereon, to automatically cycle the hydrostatic test valve between the fully open and closed position under control of the computer. During manual operation, hydrostatic testing fluid under high pressure is present at the high-pressure fluid inlet 308. With the manual operations lever 304 positioned in a first position, the unit under test is fluidly isolated from the pipe openings 115 and fluidly coupled to the high pressure present at the high-pressure fluid inlet 308, for high pressure testing of the weldments of the unit under test 1066. With the manual operations lever 304 positioned in a second position, the unit under test 1066 is fluidly isolated from the high-pressure fluid inlet 308 and fluidly coupled to the pipe openings 115, for leak testing of the weldments of the unit under test 1066.

In one embodiment a testing and processing procedure for a unit under test 1066 (for example, a high-pressure gas line) is comprised of a series of actions allowing for flow of fluids through the unit under test and gauging of the response of the unit under test thereto. One testing and processing procedure for a high pressure gas line is initiated by a user connecting the unit under test 1066 to corresponding unit adaptors 201, and then connecting those unit adaptors to a piping at the pipe opening 115, 115a or 115'. The user must secure the fitting halves together manually by fitting and turning the female fitting halves over and with respect to the corresponding male fitting halves and tightening them to a specified torque using a torque wrench capable of either detecting the torque applied, displaying or toning an audible signal indicative that the desired torque has been achieved, or both, or tighten them together with a manual torque wrench or by following the manufactures prescribed method for insuring proper assembly of the joint. Alternatively, the fitting halves can be threaded together to a "hand tight" condition, after which a certain number of partial or full turns of the female fitting half with respect to the male fitting half is performed.

With the unit under test 1066 properly connected to the pipe openings 115 (or 115', 115a), the user, in one aspect, initiates an automated testing and processing procedure by selecting the procedure by first entering the appropriate code for the unit under test 1066 into the graphical user interface 113 using a touch pen on a virtual keyboard displayed on the graphical user interface 113, by manually touching the virtual keyboard, or by an operation distant from the graphical user interface 113 in the computer automated user interface surface. Prior to the start of the procedure, all of the valves in the system are initialed or set to the closed position by signals from the computer instructing the valves to achieve or maintain the closed position or instructing the EV Block 1053 to perform that function with respect to pneumatically operated valves used herein.

Figure 4:
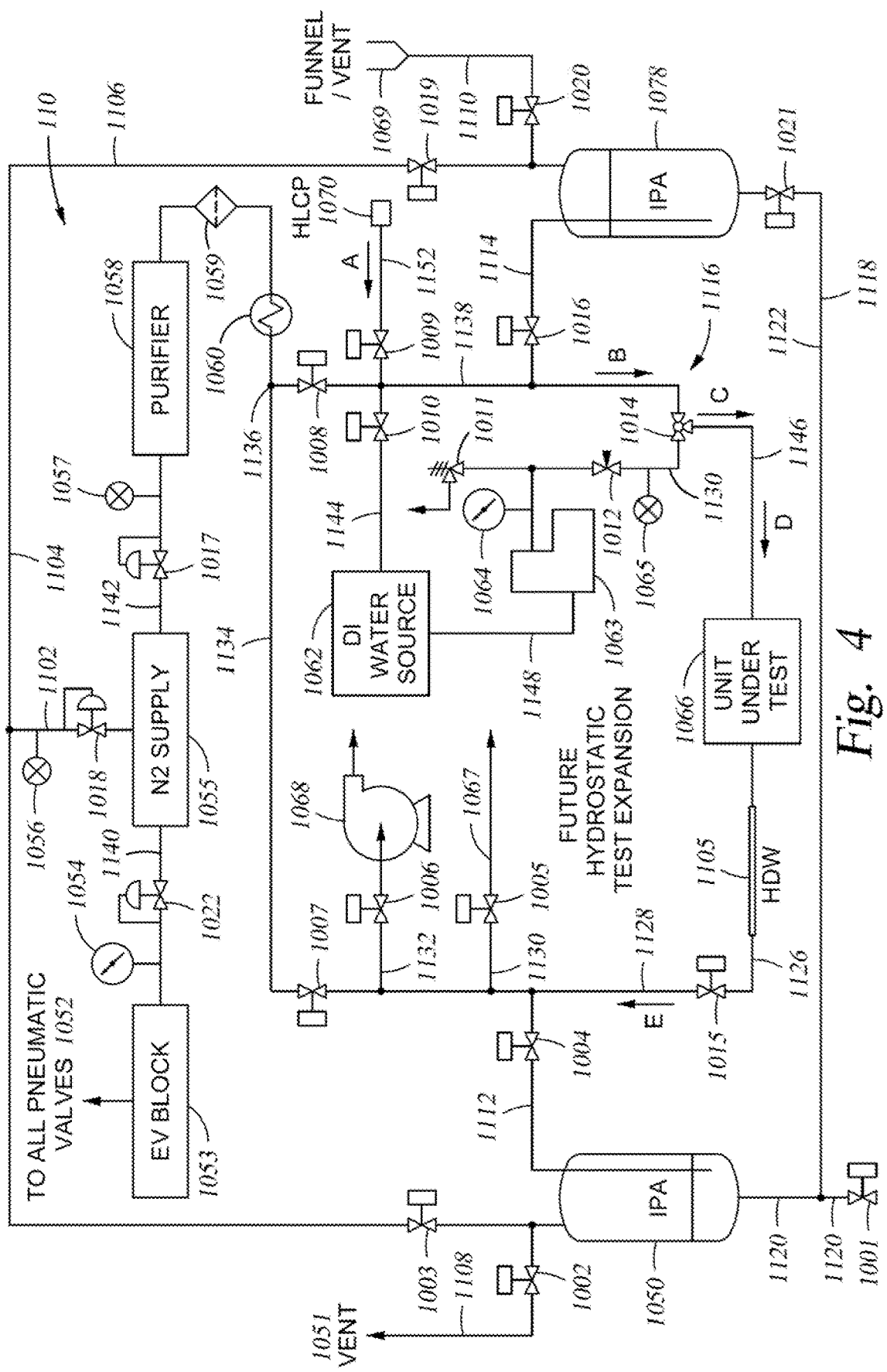
FIG. 4 shows a configurable piping fluid test circuit of the testing cabinet of FIG. 1, as well as a configuration thereof to perform vacuum leak testing of the weldments of a unit of piping under test, herein a unit under test.

Referring to FIG. 4, the testing pipings 110 are configurable, by the use of valves, to configure multiple different fluid circuits to enable the different testing regimes for the unit under test 1066. Specifically, the testing pipings 110, which include a plurality of individual pipings and valves, are configurable to provide at least a vacuum pressure (sub-atmospheric pressure), a gas such as nitrogen, IPA, and deionized water, to the interior fluid passage(s) of a unit under test 1066.

The individual circuits include a nitrogen supply circuit. To provide nitrogen, useful to pressurize the fluid tanks 103, as well as to purge or push other fluids out of the pipings of the testing pipings and a unit under test 1066, a factory nitrogen supply is connectable into the cabinet at 100 at the nitrogen supply 1055 port 1055a (at the upper center of FIG. 2C). A first configurable main nitrogen pressure line extends within the cabinet from the nitrogen supply at 1055, to a branch wherein a first nitrogen pressure subline extends to one of the fluid tanks 103, here first IPA tank 1078, through a first selector valve 1019. First selector valve 1019 is a pneumatic valve, the opening and closing of which is controlled by a gas pressure selectively applied to an operation selector element thereof, the pressure selectively directed thereto by a EV block 1053 under control of the computer or controller of the cabinet. When the first selector valve 1019 is in an open position, nitrogen flows therethrough from first nitrogen pressure subline 1106 and into the first IPA tank 1078 to form a pressurized nitrogen blanket over the liquid IPA in the first IPA tank 1078. A second nitrogen pressure subline 1104 extends from the branch and into a second tank 103, here the second IPA tank 1050, through a second selector valve 1003, to selectively supply nitrogen under pressure over the liquid IPA in the second IPA tank 1050. The nitrogen under pressure in the first and second IPA tanks 1050, 1078 ensures sufficient energy is present to push liquid IPA out of one of the tanks (first tank 1078 or second IPA tank 1050) and through the unit under test 1066 when it is being flushed with IPA, by a configuration of the testing pipings 110 in the cabinet 100. As will be described herein, the testing pipings 110 are configured herein so that IPA passing through the unit under test is flowed from one of the first IPA tank 1078 and the second IPA tank 1050, through the unit under test 1066, and thence into the other of the first IPA tank 1078 and the second IPA tank 1050. To flow the IPA from the first IPA tank 1078 to the second IPA tank 1050 through the unit under test 1066, the first IPA tank 1078 is pressurized and the second IPA tank 1050 is depressurized or vented to local atmospheric pressure, allowing flow from the first IPA tank 1078 to the second IPA tank 1050. When the IPA is moving from the second IPA tank 1050 to the first IPA tank 1078, the second IPA tank 1050 is pressurized and the first IPA tank 1078 is depressurized or vented to local atmospheric pressure, allowing flow from the second IPA tank 1050 to the first IPA tank 1078, through the unit under test 1066, when the IPA flush occurs. To reduce the pressure in the first IPA tank 1078, the Nitrogen supply circuit includes a first vent valve 1020 connected to the first nitrogen pressure subline 1106 between the first selector valve 1019 and the opening of the first nitrogen pressure subline into the first IPA tank 1078, to selectively connect a first nitrogen pressure vent line 1110 to the first IPA tank 1078, with the first selector valve 1019 in the closed position to prevent nitrogen from flowing from the nitrogen source into the first IPA tank 1078, to vent the pressure over the IPA in the first IPA tank 1078 to an atmospheric or surrounding ambient vent 1069, such as to a facility central exhaust system via a connection through the back panel of the cabinet. To reduce the pressure in the second IPA tank 1050, the Nitrogen supply circuit includes a second vent valve 1002 connected to the second nitrogen pressure subline 1104 between the second selector valve 1003 and the opening of the second nitrogen pressure subline 1104 into the second IPA tank 1050, to selectively connect a second nitrogen pressure vent line 1108 to the second IPA tank 1050, with the second selector valve 1003 in the closed position to prevent nitrogen from flowing from the nitrogen source into the second IPA tank 1050, to vent the pressure over the IPA in the second IPA tank 1050 to an atmospheric or surrounding vent 1051 open to the ambient surrounding the cabinet 100. IPA can be introduced or added into the first IPA tank 1078 through the second vent/funnel 1069. A similar filling funnel may alternatively, or additionally, fluidly connected to the first IPA tank 1078.

The nitrogen supply circuit also includes a first nitrogen branch line 1140, and a second nitrogen branch line 1142. The first nitrogen branch line 1140 is connected to the EV block through a pressure regulator 1022, which is also connected to a block pressure gauge 1054. This supplies nitrogen at a regulated pressure to the EV block, which nitrogen is selectively supplied through the EV block to the pneumatic valves of the testing circuit through pneumatic control tubings (Not shown). The second nitrogen branch line 1142 is configured to connect the Nitrogen from the nitrogen source at 1055 to a unit under test 1066 in a fluid line circulation circuit 1116 configured of the testing pipings 110 in the cabinet, which will be described in further detail herein. Second nitrogen branch line 1142 includes a regulator 1017 to regulate the nitrogen pressure therein within a selected pressure range, a filter 1059 to remove particulates in the nitrogen flow, a purifier 1058 to act as a getter to remove non-nitrogen gas, and a heater 1060.

The IPA fluid circuit includes an IPA flush circuit. This circuit includes a first IPA flush line 1114 which extends from within the liquid volume of the IPA in the first IPA tank 1078 to a first IPA flush valve 1016, which is a pneumatic valve controlled by pneumatic pressure selectively supplied by the EV block 1053. From the first IPA flush valve 1016, the first IPA flush line 1114 fluidly connects into the fluid line circulation circuit 1116 within which the unit under test 1066 forms a flow path, as will be described later herein. For reference purposes only, the first IPA flush line 1114 is here considered as being fluidly connected to a first side of the fluid line circulation circuit 1116 and unit under test 1066. A second IPA flush line 1112 extends from within the fluid volume of the IPA in the second IPA tank 1050 and outwardly of the second IPA tank 1050 into a second IPA flush valve 1004. The second IPA flush valve 1004 is a fluid operated valve under the control of the EV block 1053. Through the second IPA flush valve 1004, the second IPA flush line 1112 is fluidly connected to the fluid line circulation circuit 1116 on a second side of the fluid line circulation circuit 1116 and unit under test 1066.

The IPA circuit also includes a flush circuit. In this flush circuit 1118, a second IPA drain line 1120 extends downwardly from the second IPA tank 1050 toward a branched line. A first IPA drain line 1122 extends downwardly form a lower portion of first IPA tank 1078. The first IPA drain line 1122 and the second IPA drain line 1120 connect to a common drain line 1124, the opening and closing of which is controlled by a drain valve 1001 which can be opened or closed to allow IPA to be drained away to a separate waste line or for recycling thereof.

The fluid line circulation circuit 1116 allows different fluid components used in the testing of a unit under test 1066 to be selectively connected to the unit under test 1066. The fluid line circulation circuit 1116 includes a first circulation fluid line 1126 connecting between the location of the second side of a unit under test 1160 to a connection with a high pressure (HP) ball valve 1015, which connects, through the HP ball valve 1015, to a second circulation fluid line 1128 which is connected to the second IPA flush line 1112 through the second IPA flush valve 1004. The second circulation fluid line 1128 is also connected to a second drain line 1130 connected to a pneumatic valve, here a second drain valve 1005, which selectively fluidly communicates the second drain line to a drain 1067 under control of the EV block 1053. The second circulation fluid line 1128 continues to a connection with a third branch line 1132 connected to a vacuum control line valve 1006, which selectively communicates the third branch line with to a rough vacuum pump 1068. The first circulation fluid line is fluidly connected, at its end distal to HP ball valve 1015, to a first circulation pneumatic valve 1007 controlled by the EV block 1053.

A third circulation fluid line 1134 extends from a fluid connection with the first circulation pneumatic valve 1007 to a circulation tee, to which are fluidly connected a third circulation fluid line 1138 of the fluid line circulation circuit 1116, and the second nitrogen branch line 1142. The fluid connection of the third circulation fluid line 1134 and the second nitrogen branch line 1142 into the fourth circulation fluid line 1138 is controlled by a second pneumatic circulation line valve 1008. The fourth circulation fluid line 1138 extends from the second pneumatic circulation line valve 1008 to a three-way selector ball valve 1014. Between the three-way selector ball valve 1014 and the second pneumatic circulation line valve 1008, the fourth circulation fluid line 1138 is connected to a plurality of fluid lines. A first deionized water line 1144, connected to a house deionized water source at 1062 supplied through a connection therefor on the back panel of the cabinet 100, is connected thereto through a deionized water pneumatic valve 1010 under control of the EV block 1053. In addition, the first IPA flush line 1114 connects into the fourth circulation fluid line 1138, between the three-way selector ball valve 1014 and the connection of the first deionized water line 1144. A helium leak check port line 1152 connected to a helium leak check control line valve 1009 selectively operates to allow helium leak check 1070, such as an external helium leak tester, to pull vacuum on the fourth circulation fluid line 1138. A fifth circulation fluid line 1146 extends from the three-way selector ball valve 1014 to the first side of the testing position of a unit under test 1066.

An integrated high pressure test system 1063, capable of pressurizing deionized water obtained from the housed deionized water source 1062, may be provided in place of the high pressure valving of FIG. 2C. This integrated high pressure test system 1063 is connected to the third inlet to the three-way selector ball valve 1014, to enable supply of fluid under high pressure to a unit under test 1066 for pressure testing thereof.

The hydrostatic test circuit is provided by connecting a high pressure test system 1063, for example a Maxpro Hydrostatic test unit, to the second side of the unit under test 1066. A second deionized water line 1148 extends from the house DI water source at 1062 to an inlet to the high pressure test system 1063. A pressurized deionized water line 1150 extends from the high pressure test system 1063 to the third inlet to the three-way selector ball valve 1014. A pressure gauge 1064, and a relief valve 1011, set to a blow off pressure below an undesired pressure in the deionized water line 1150, are connected to the deionized water line 1150. A needle valve 1012 capable of operating under high fluid pressures is present in the pressurized deionized water line 1150 between the high pressure test system 1063 and the three-way selector ball valve 1014. The needle valve can be operated to control the flow volume of the high-pressure deionized water flowing therethrough. By the proper selection of the valve positions in the testing piping, different fluids can be flowed through the interior of a unit under test 1066, and thus different tests can be performed on a unit under test 1066.

Additionally, a test port that could be selectively connectable to a sensor that could include residual gas analysis (RGA), moisture level detection, airborne particle measurement or sample collection vessel for total organic composition (TOC) or any other required sampling or detection may be provided. For example, this port can be located downstream of the unit under test.

In one aspect, where the unit under test need not be hydrostatically, i.e., high pressure, tested, the unit under test may be processed in the following sequence.

Step 1—Helium Leak Check
Step 2—N2 Purge to remove residual DI water from the pressure test
Step 3—Solvent (IPA) rinse
Step 4—N2 purge to remove residual solvent
Step 5—DI Water Flush
Step 6—Heated N2 purge to remove residual DI water and Dry
Step 7—Vacuum dry with internal vacuum pump 1068.

In another aspect, where a unit under test is to be evaluated for pressure capacity, i.e., the ability to hold high pressure, one series of tests is as follows. After the unit under test 1066 is connected into the test system, the following test sequence will be performed.

Step 1—Helium Leak Check
Step 2—Hydrostatic Pressure Test
Step 3—N2 Purge to remove residual DI water from the pressure test
Step 4—Solvent (IPA) rinse
Step 5—N2 purge to remove residual solvent
Step 6—DI Water Flush
Step 7—Heated N2 purge to remove residual DI water and Dry
Step 8—Vacuum dry with internal vacuum pump 1068.

Hereafter, the sequence of operations to perform the eight step testing, cleaning and drying of a unit under test is described herein. However, the sequences of operations described herein relate, at each step, generally to how to configure the test pipings 110 and the valves within the cabinet 100 to perform a helium leak test and a high pressure test on a unit under test 1066, and how to clean and dry the unit under test 1066. These sequences of operation can be changed to perform the seven step test outlined above where hydrostatic testing is not performed, or other numbers or sequences of steps, simply by changing the timings of the sequences of operations to create the different configurations of the pipings 110 and valves to perform the tests, cleaning and drying as disclosed herein. Thus, the cabinet provides a user thereof the ability to program, or cause, any sequence of testing, cleaning and drying operations desired, using nitrogen, a leak test fluid such as helium, a high pressure source, a nitrogen source and a solvent such as IPA. Additionally, the solvents and gases used herein, if desired by a user to adapt the processes performed, can be substituted with other gases and solvents.

In the first step of the eight step test process, a helium leak check of the unit under test 1066 is conducted. To conduct this Helium Leak Check, an external Helium Leak Test device is connected to the Helium Leak Test port 1070 through the rear skin of the cabinet 100, or, a dedicated helium leak check device capable of vacuum exhausting the internal volume of the testing pipings 110, valves and unit under test and determining the presence of Helium can be integrated into the cabinet. With the helium leak check device 1174 connected to the helium leak check port line 1152 through the port 1070, the computer will initiate the vacuum leak test by closing vacuum control line valve 1006, the first pneumatic circulation line valve 1007, the second pneumatic circulation line valve 1008, deionized water pneumatic valve 1010, the second drain valve 1005, the first IPA flush valve 1016, and the second IPA flush valve 1004 to prevent fluid flows therethrough, by opening helium supply control line valve 1009 and the HP ball valve 1015 to allow fluid flows therethrough, and by positioning the three-way selector ball valve 1014 to fluidly connect the fourth circulation fluid line 1138 to fifth circulation fluid line 1146, and isolate the deionized water line 1150 from the fifth circulation fluid line 1146, and thereby connect the helium leak check vacuum device 1174 such that vacuum is pulled through the unit under test 1066. The helium leak check vacuum device 1174 is preferably capable of obtaining a pressure within the testing pipings 110 and the unit under test 1160 on the order of $10^{-9}$ torr of less. Once the vacuum pressure level is reached in the unit under test 1066 as required for the leak test based on the individual test specifications of the unit under test 1066, helium (bottle not shown) is released such as by spraying helium on or at the external surfaces of the unit under test 1066, focusing the release of helium at the connections and welds or weldment areas of the unit under test 1066. The vacuum is pulled to cause fluid in the testing pipings 110, valves and unit under test 1066 to flow in the direction of arrows A to E as shown in FIG. 4, such that residual fluid in the first circulation fluid line 1126, the fifth fluid circulation line 1146, the unit under test 1066, the fourth fluid circulation line 1138, the three-way selector ball valve 1014 and the helium leak check port line 1152 is pulled outwardly thereof by pumping action of the helium leak check vacuum device 1174. This residual fluid is thus flowed by being pumped by the helium leak check vacuum device 1174, through helium check line valve 1009 in the direction of arrow A, through the fourth circulation fluid line 1138 leading to the three-way selector ball valve 1014 in the direction of arrow B, through three-way selector ball valve 1014 in the direction of arrow C, and into the unit under test 1066 in the direction of arrow D. Then, the vacuum is pulled though the HP ball valve 1015 in the direction of arrow E. Once sufficient fluid has been pulled from the unit under test 1066 to establish the desired vacuum pressure for testing, the vacuum leak test can begin by releasing or spraying helium at the unit under test 1066.

A helium source or sprayer, such as in the form of an elongated pipe or wand 1105, is positioned sequentially at the exterior of the weldments of the unit under test 1066, to release helium after the desired vacuum pressure level has been reached within the unit under test 1066. If there are openings extending through the weldments from the outer to inner sides of the pipings or tubings at the weldment that are larger than a size on the order of a helium atom, helium will be sucked through the opening and be detected by a detector at the helium leak check vacuum device 1174. If helium is detected by the helium leak vacuum device 1174, the unit under test 1066 is rejected and either scrapped or reworked. Helium is used as a leak test gas as it is the smallest inert gas molecule, and will infiltrate extremely small atomic sized gaps in a weld of a weldment.

Figure 5:
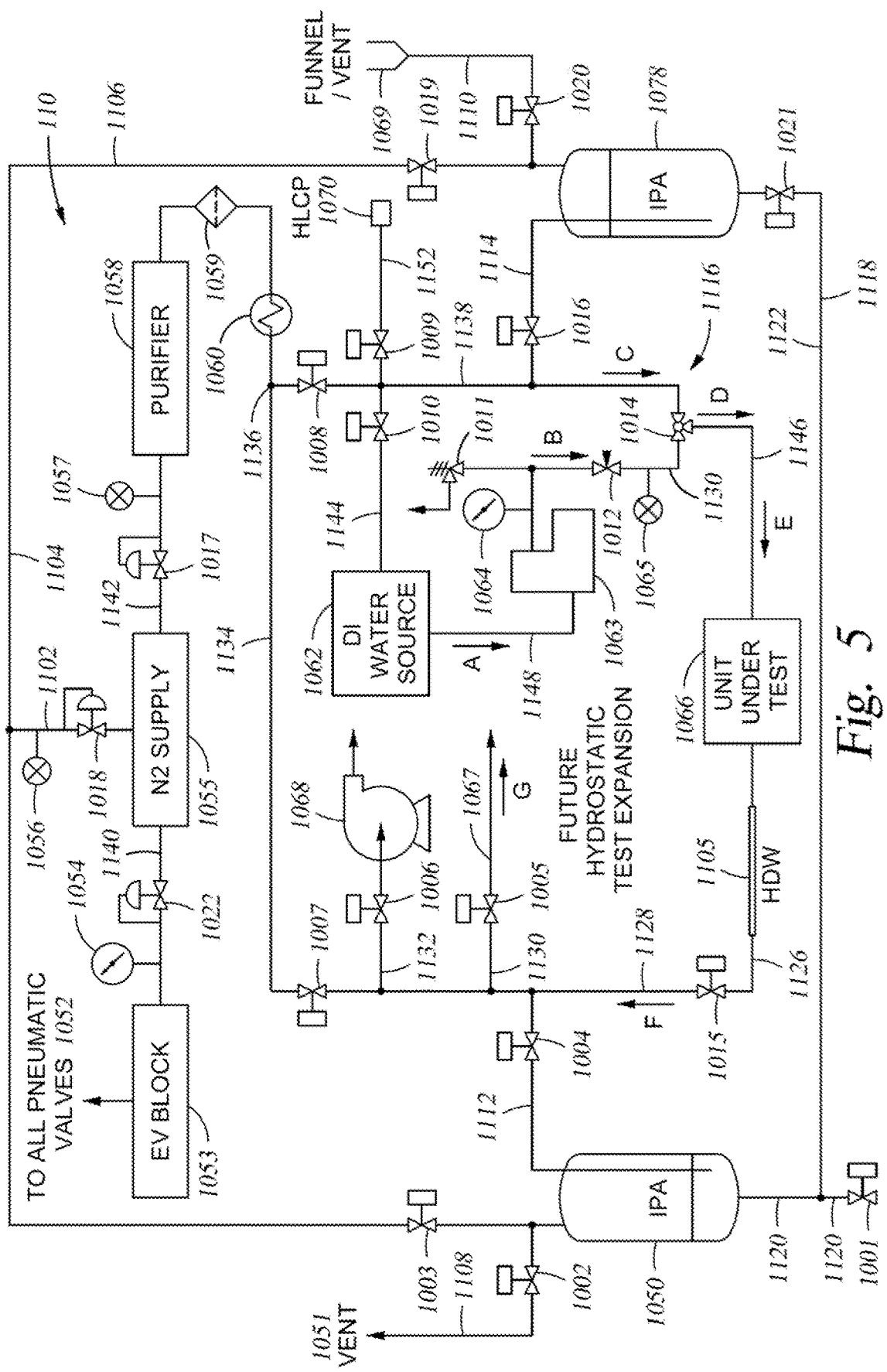
FIG. 5 depicts a configuration of the piping fluid test circuit of FIG. 4 to form a flow path for automated hydrostatic pressure testing of a unit under test using high pressure water or another high pressure fluid.

Following the conclusion of the vacuum leak test, or otherwise, based on user requirements, the unit under test 1066 can undergo hydrostatic pressure testing as the second test of the above-described eight step process. Referring to FIG. 5, the computer initiates this procedure by shutting all on-off valves i.e., those valves only having an open or closed state and connected between two testing pipings 110, or assessing each on off valve for its shut status and shutting any valve that may have opened since the previous action sequence. Then, valves are selectively opened or in the case of three way valves, selectively positioned, to allow fluid to flow from the DI water source 1062 to the first circuit fluid circulation line 1126 which is deadheaded, i.e., closed off at its end distal to the unit under test 1066, by closing, or maintaining closed, the high pressure ball valve 1015. To so configure the fluid line circulation circuit 1116, the computer instructs the EV block to position three-way selector ball valve 1014 to communicate pressurized deionized water line 1150 with the fifth circulation fluid line 1146, and isolate the fourth circulation fluid line 1138 from the fifth circulation line 1146. The computer opens the HP ball valve 1015 and the second drain valve 1005 as well. As shown in FIG. 5, the high pressure test system 1063 receives deionized water from the deionized water source 1062 through the second deionized water line 1148 in the flowing in the direction of arrow A, and compresses this water to a higher pressure which is output therefrom through the pressurized deionized water line 1150 in the directions of arrows B and C. This water initially flows at a low pressure, through the fifth circulation fluid line 1146, through the unit under test 1166, through the first circulation fluid line 1126, the HP ball valve 1015 and the second circulation fluid line 1128, and then through the second drain valve 1005 and into the drain 1067. Once the lines are filled with deionized water, the HP ball valve 1015 is closed, and the high pressure test system 1063 continues to increase the pressure of the deionized water, which pressure is communicated in the static water column in the lines and the unit under test 1066, until the pressure for the pressure test is achieved and held for a predetermined period of time. Alternatively, the HP ball valve 1015 can be maintained in the closed position when the deionized water is initially being pressurized by the high pressure test system 1063. In this construct, if a vacuum pressure was previously present in the testing pipings 110 and the unit under test 1066, the deionized wat will fill the through the internal volume of the unit under tests 1066. If a gas is present in these testing pipings 110 and unit under test 1066, as the gas is far more compressible than the deionized water, the gas will compress as the deionized water is compressed, and the high pressure water will extend throughout the interior volume of the unit under test 1066.

If, during the pressurizing of the deionized water, and for a user selected period after the full pressure of the deionized water is achieved, water is detected leaking from the unit under test 1066, the unit under test is 1066 discarded or reworked. After the pressure test is completed, the water pressure in the lines and the unit under test 1066 is reduced in a very rapid fashion, by opening the second drain valve 1005 and then HP ball valve 1015 to relieve that water pressure through the second drain valve 1005 and the drain 1067 (or a separate drain or relief valve 1011 in the high pressure test system 1063 is opened to vent the water pressure). Likewise, the high pressure test system 1063 itself, once the pressure is achieved, stops compressing water. The waste product collected from the unit under test collects into the drain 1067, where it can be removed for appropriate disposal.

During high pressure testing, the pressure in the unit under test 1066 can be measured at the pressure transducer 1065, and recorded in the computer memory against the identity of the unit under test 1066. If there is a leak that allows water to escape the unit under test 1066, the flow pressure will not be able to be maintained, may never reach the appropriate test pressure for the unit under test 1066, or the pressure ramp rate, measured as the pressure rise over a unit of time, may be out of a tolerance range for a low ramp rate. Using the pressure transducer 1065, the computer can maintain these pressure readings, calculate and compare the pressure ramp rate to the specific ramp rate for the specific unit under test, and provide a visual alarm on the GUI or an audio alarm if a unit under test is not passing the test. In addition, if there is a blockage in the unit under test 1066 that prevents flow or impedes adequate flow, high flow pressure will be detected by the transducer, again indicating a defect in the unit under test 1066. Additionally, a user can manually enter information regarding the pass or fail of a unit under test 1066 based on an observation of water seepage or leakage form the unit under test 1066. If an undesirably high pressure occurs in the pressurized deionized water line 1150, relief valve 1011 will automatically open based on the blow off or opening pressure set point of the relief valve 1011. Following the high-pressure test, a correlation of the identity of the unit under test 1066, and the maximum pressure and period of exposure to the maximum pressure is maintained in the computer or controller memory, or a separate memory device. Opening of the relief valve 1011 can also triggers the computer or controller to immediately open the second drain valve 1005.

Figure 6:
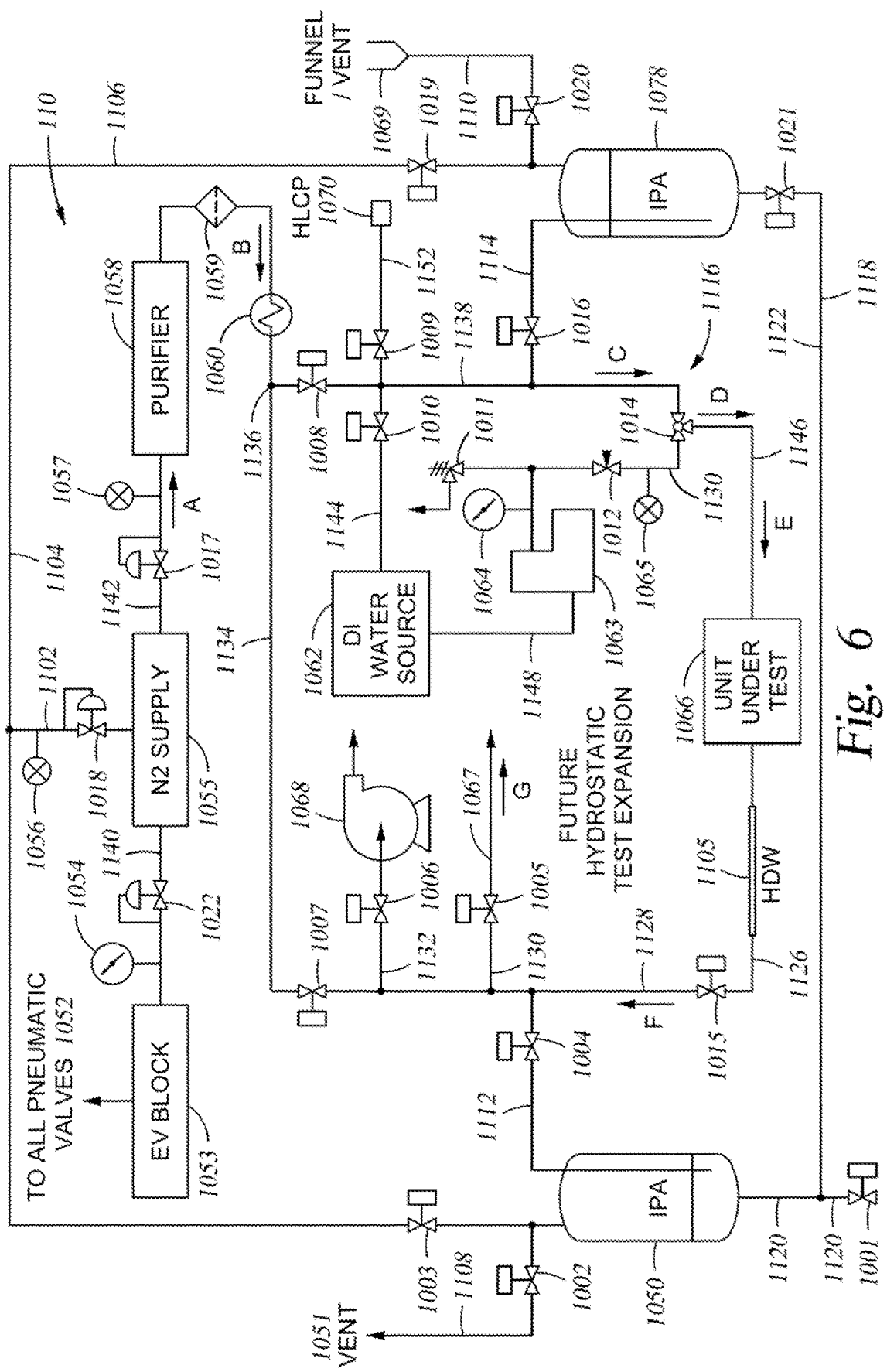
FIG. 6 depicts a configuration of the piping fluid test circuit of FIG. 4 to form a flow path for pushing water from the unit under test and flushing/drying the unit under test with heated nitrogen.

In one aspect hereof, following the conclusion of the pressure testing, the unit under test 1066 is flushed with heated N2 (nitrogen) in the third step of the eight step process. The computer initiates this procedure by shutting all on-off valves, or assessing each on-off valve for it is off or shut status and shutting any valve that may have opened since the previous action sequence. The computer then instructs the EV block to open the first pneumatic circulation line valve 1008, and second drain valve 1005. It also positions three-way selector valve 1014 to isolate the pressurized deionized water line and fluidly connect the third circulation fluid line 1038 to the fifth circulation flow line 1146. The computer also opens the HP ball valve 1015. This allows the N2 to flow from the N2 source supply 1055. As shown in FIG. 6, with the valve positions thus set, the N2 flows in the direction of arrow A in the second nitrogen branch line 1142 through regulator 1017 and past pressure transducer 1057 in the direction of arrow B, through the purifier 1058, the filter 1059, the N2 heater 1060 and through the second pneumatic circulation line valve 1008 in the direction of arrow C. The nitrogen, heated by the heater 1060, then flows through the fourth and fifth circulation fluid lines 1138, 1146 and into the unit under test 1066 in the direction of arrow D. It then flows through the second circulation fluid line 1128 in the direction of arrow E and then and through the second drain valve 1005 in the direction of arrow F.

The flow of nitrogen to purge water from the interior of the unit under test, as well as the testing pipings 110 and valves, continues for a period of time sufficient to remove moisture absorbed into, or adsorbed onto, the inner surfaces of the unit under test 1066, testing pipings and valves which was in contact with the deionized water during pressure testing. The N2 can be heated at heater 1060 as it passes therethrough, to increase its drying capability.

Figure 7:
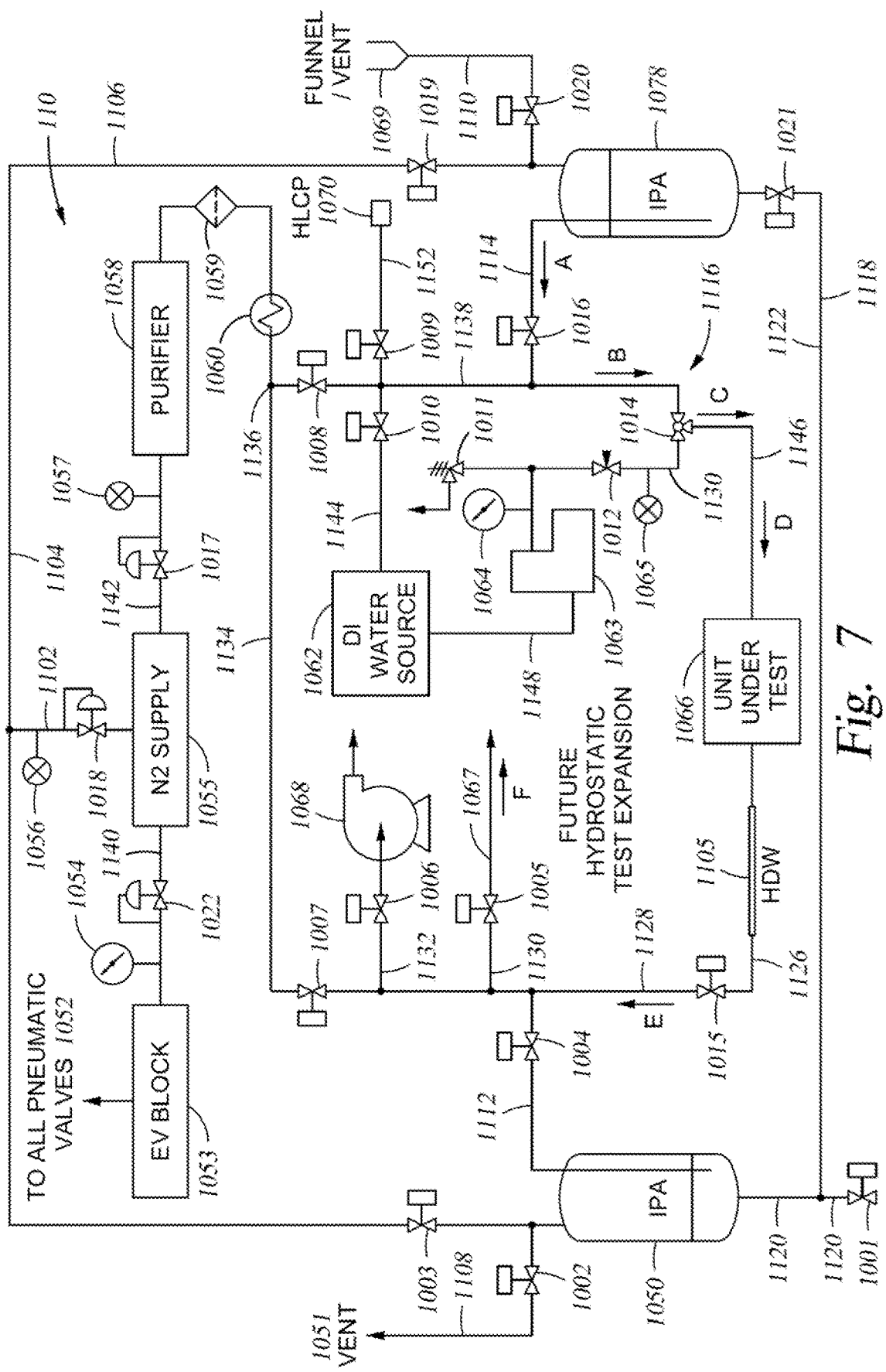
FIG. 7 depicts a configuration of the piping fluid test circuit of FIG. 4 to form a flow path for flushing of a unit under test using isopropanol (IPA) which is pressurized to flow in a portion of the fluid test circuit by nitrogen gas pressure over the IPA in an IPA storage tank.

In one aspect hereof, following the conclusion of the N2 purge, the unit under test is cleaned or rinsed with solvent (IPA) in the fourth step of the eight step process described above. Again, to perform this step, the computer initiates this procedure by shutting all on-off valves, or assessing each on-off valve for its status and shutting any on-off valve that may have opened since the previous action sequence. The computer opens the first and second IPA flush valves 1016, 1004 under control of the EV block, and the HP ball valve 1015, and sets the three-way selector ball valve 1014 to isolate the high pressure test system 1063 from the fifth circulation fluid line and allow communication between the fourth circulation fluid line 1138 and fifth circulation fluid line 1146. As discussed herein, flow of the IPA is maintained between the first and second IPA tanks 1078, 1050 to ensure, during operation of the cabinet 100 to perform testing on a unit under test 1066, a pressurized blanket of nitrogen gas is present over the liquid IPA in one of the first and second IPA tanks 1078, 1050, while the pressure over the liquid IPA in the other of the first and second IPA tanks 1078, 1050 is on the order of local ambient (external to the cabinet) atmospheric pressure. Thus, where the volume of IPA in the first IPA tank 1078 is greater than that in the second IPA tank 1050, IPA flows from the first IPA tank 1078, through the unit under test 1066, and thence into the second IPA tank 1050 as shown in FIG. 7. Specifically, with a positive, above ambient atmospheric, nitrogen pressure above the IPA in the first IPA tank 1078, and the second IPA tank 1050 vented to atmosphere by opening the second vent valve 1002, IPA flows from the first IPA tank 1078 through the first IPA flush line 1114 as shown by arrow A, the fourth circulation fluid line 1138 in the direction of arrow B, the fifth circulation flow line 1146 in the direction of arrows C and D, through the unit under test 1066, thence in the first circulation line 1026 (including the first circulation branch line 1028) in the direction of arrow E, and thence into the first IPA flush line 1114 in the direction of arrow F and into the second IPA tank 1050. The presence of atmospheric pressure above the IPA in the second IPA tank 1050, as compared to the higher pressure pressurized nitrogen in the first IPA tank 1078, can be assured by the computer instructing the EV block to open the second vent valve 1002, so as the volume or quantity of IPA in the second IPA tank 1050 increases, a constant, surrounding ambient atmospheric pressure is maintained thereover in the second IPA tank 1050. Likewise, the computer can instruct the EV block to open the first selector valve 1019 while the second selector valve 1003 remains closed, to increase the nitrogen pressure over the IPA in the first IPA tank 1078. As the volume of the IPA in the second tank increases to a value substantially greater than that of the IPA in the first IPA tank 1078, the flow of IPA through the unit under test 1066 is reversed. This is accomplished by opening the first and second IPA flush valves 1016, 1004 under control of the EV block, and the HP ball valve 1015, and setting the three-way selector ball valve 1014 to isolate the high pressure test system 1063 and allow communication between the fourth circulation fluid line 1138 and the fifth circulation fluid line 1146. As long as the nitrogen pressure in the second IPA tank 1050 is sufficiently greater than the pressure over the IPA in the first IPA tank 1078 to overcome any minimal frictional flow losses therebetween, the IPA will now flow from the second IPA tank 1050 to the first IPA tank 1078. Likewise, as long as the nitrogen pressure in the first IPA tank 1078 is sufficiently greater than the pressure over the IPA in the second IPA tank 1050 to overcome any minimal frictional flow losses therebetween, the IPA will now flow from the first IPA tank 1078 to the second IPA tank 1050. Again, to help ensure this pressure differential being higher in the second IPA tank 1050, the first vent valve 1020 can be opened to maintain the surrounding ambient atmospheric pressure over the IPA in the first IPA tank 1078, and the second selector valve 1003 opened to supply nitrogen under pressure over the IPA in the second IPA tank 1050, with the second vent valve 1002 in the closed position. Alternatively, the second vent valve 1002 or first vent valve 1020 can be periodically opened, to reduce the pressure of the nitrogen over the IPA in the first and second IPA tanks 1078, 1050, respectively, as required depending on the flow direction of the IPA between the tanks, to maintain the proper nitrogen pressure differential for the desired flow rate and flow direction of the IPA therebetween. Additionally, or alternatively, one of the first and second selector valves 1019, 1003 can be selectively opened to selectively increase the nitrogen pressure in a desired one of the first and second IPA tanks 1078, 1050, respectively, as required depending on the flow direction of the IPA between the tanks, to maintain the proper nitrogen pressure differential for the desired flow rate and flow direction of the IPA therebetween.

The direction of flow of the IPA during the IPA flush of the unit under test can be reversed when one of the first and second IPA tanks 1078, 1050 has been nearly filled with IPA and the other of the first and second IPA tanks 1078, 1050 is nearly empty, for example only after one or more units under test 1066 have been flushed with IPA flowing in the same direction. Alternatively, the direction of the flow of the IPA during flushing of an individual unit under test 1066 can be reversed one or more times in a single unit under test 1066. This can help ensure any particulates that may have settled therein, particularly during the DI water test, have been flushed out of the unit under test 1066. At the conclusion of the IPA flush, the computer closes all open on-off valves.

Figure 8:
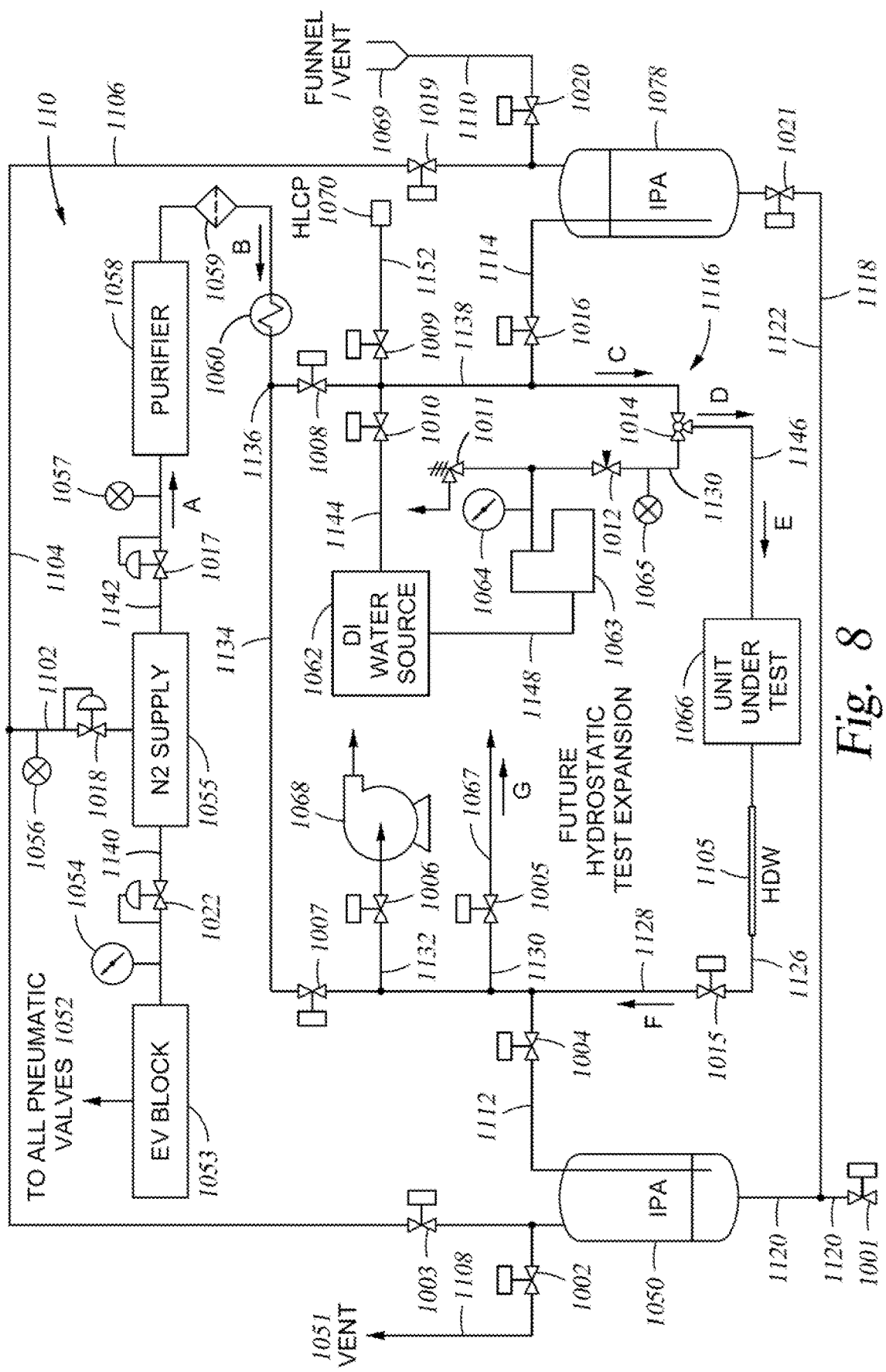
FIG. 8 depicts a configuration of the piping fluid test circuit of FIG. 4 to form a flow path for flushing of a unit under test with nitrogen following the flowing of isopropanol therethrough.

The fifth procedure in the eight step process outlined above is a $N_2$ purge or flush of the unit under test to remove residual solvent therein. This again can be performed with the $N_2$ gas heated in the heater 1060 as the gas passes therethrough. To perform an N2 flush of the unit under test 1066, the computer initially shuts all on-off valves, or assesses each on-off valve for its shut status and shuts any on-off valve that may have opened since the previous action sequence. The computer then directs the EV block to open the second drain valve 1005 and second pneumatic circulation line valve 1008, open the HP ball valve 1015, and set the three way selector ball valve to isolate the high pressure test system 1063 and establish a fluid communication path between the third circulation fluid line 1138 and the fifth circulation fluid line 1146 to create the highlighted flow path of FIG. 8. As the nitrogen pressure is regulated at a higher than atmospheric pressure, in this configuration nitrogen will flow from the higher pressure supply at 1055 to the lower pressure drain, pushing and fluid, for example water, IPA, or both present in the testing pipings 110 and the unit under test ahead of it. In one aspect, as shown in FIG. 8, this is accomplished by flowing the $N_2$ through the second nitrogen branch line 1142 in the direction of arrow A, then through the regulator 1017 and past pressure transducer 1057 in the direction of arrow B, through the purifier 1058, the filter 1059, the $N_2$ heater 1060 and through the second pneumatic circulation line valve 1008 and into the fourth circulation fluid line 1138 in the direction of arrow C. The nitrogen then flows through the three-way selector ball valve 1014, into the fifth circulation flow line 1146, and in the direction of arrow E to flow through the unit under test 1066. The nitrogen then flows, in the direction of arrow F, through the first circulation fluid line 1126 and the second circulation fluid line 1128, and then through the second drain valve 1005 to the drain 1067 in the direction of arrow G to push the IPA in the testing piping into the drain 1067.

The N2 flow can also be provided, at the unit under test 1066, bi-directionally, i.e., entering the unit under test from the first side, then the second side, or vice versa, one or more times.

Figure 9:
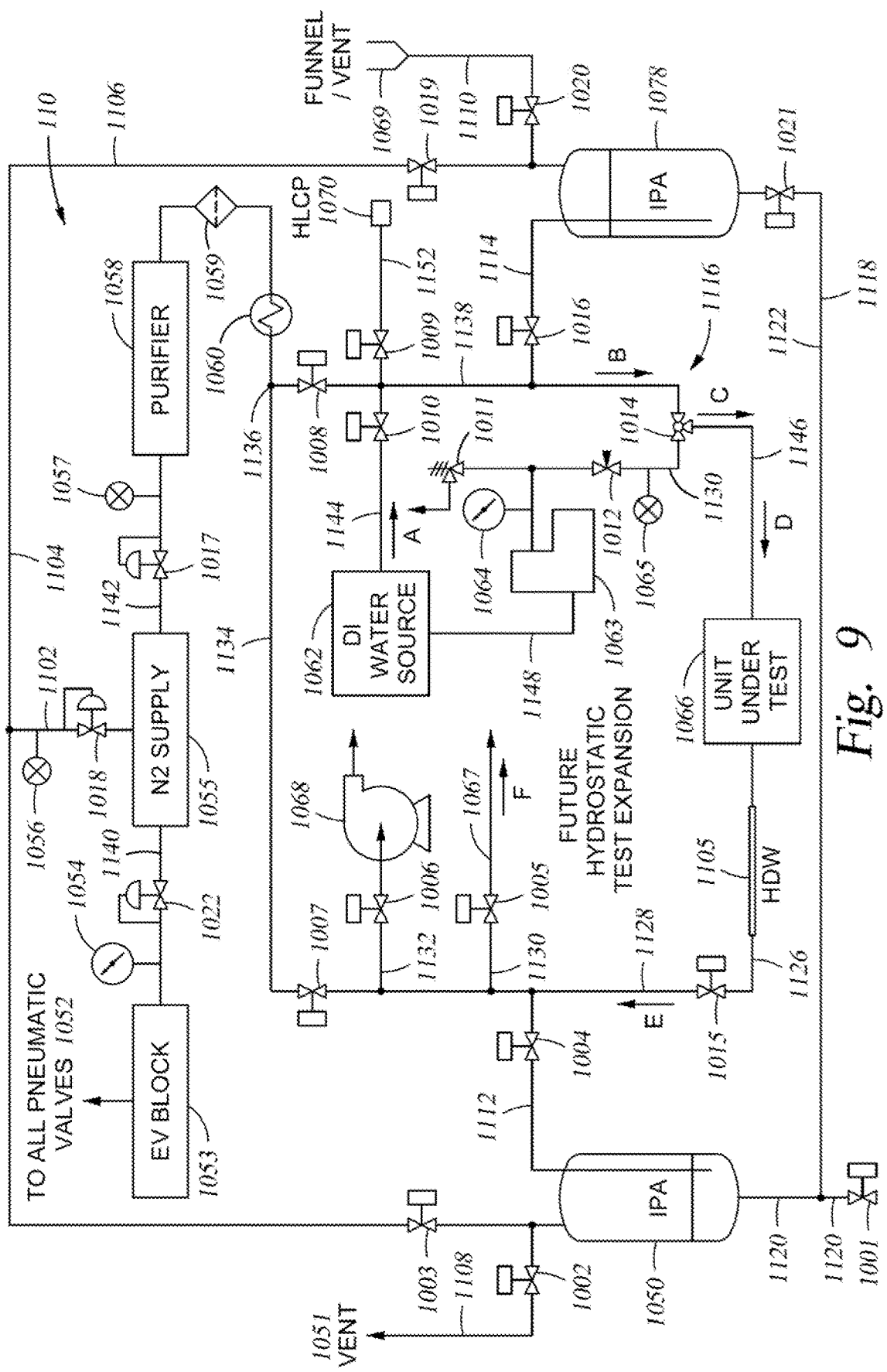
FIG. 9 depicts a configuration of the piping fluid test circuit of FIG. 4 to form a flow path for the flushing of the unit under test with deionized water.

Following the conclusion of the N2 clean operation, the unit under test can be again flushed with DI water as the sixth step in the above described eight step process, but here, not deionized water under pressure. The computer initiates this DI water flush procedure by shutting all on-off valves, or assessing each on-off valve for its shut status and shutting any on-off valve that may have opened since the previous action sequence. The computer the opens the water pneumatic valve 1010 and the second drain valve through the EV block 1053, opens the HP ball valve 1015, and positioning the three-way selector ball valve 1014 to isolate the high pressure test system 1063 and fluidly connect the third circulation fluid line 1038 with the fifth circulation fluid line 1146. With this configuration, with the DI water source at 1062 at higher pressure than the surrounding atmospheric ambient pressure, and with the second drain valve 1005 opened such that the interior of the second drain line 1130 is exposed to the surrounding atmospheric ambient pressure, the DI water flows, as shown in FIG. 9, from the source at 1062 in the direction of arrow A through the first deionized water line 1133 and the deionized water pneumatic valve 1010, through the fourth circulation fluid line 1138 in the direction of arrow B to the three-way selector ball valve 1014. After passing through three-way selector ball valve 1014, the deionized water flows through the fifth circulation fluid line 1146 in the direction of arrow to pass through the unit under test 1066 and into the first circulation fluid line 1126 to the HP ball valve 1015. Then, the deionized water flows in the direction of arrow E to the second drain line 1130, and thence to the drain 1067 in the direction of the arrow F.

Figure 10:
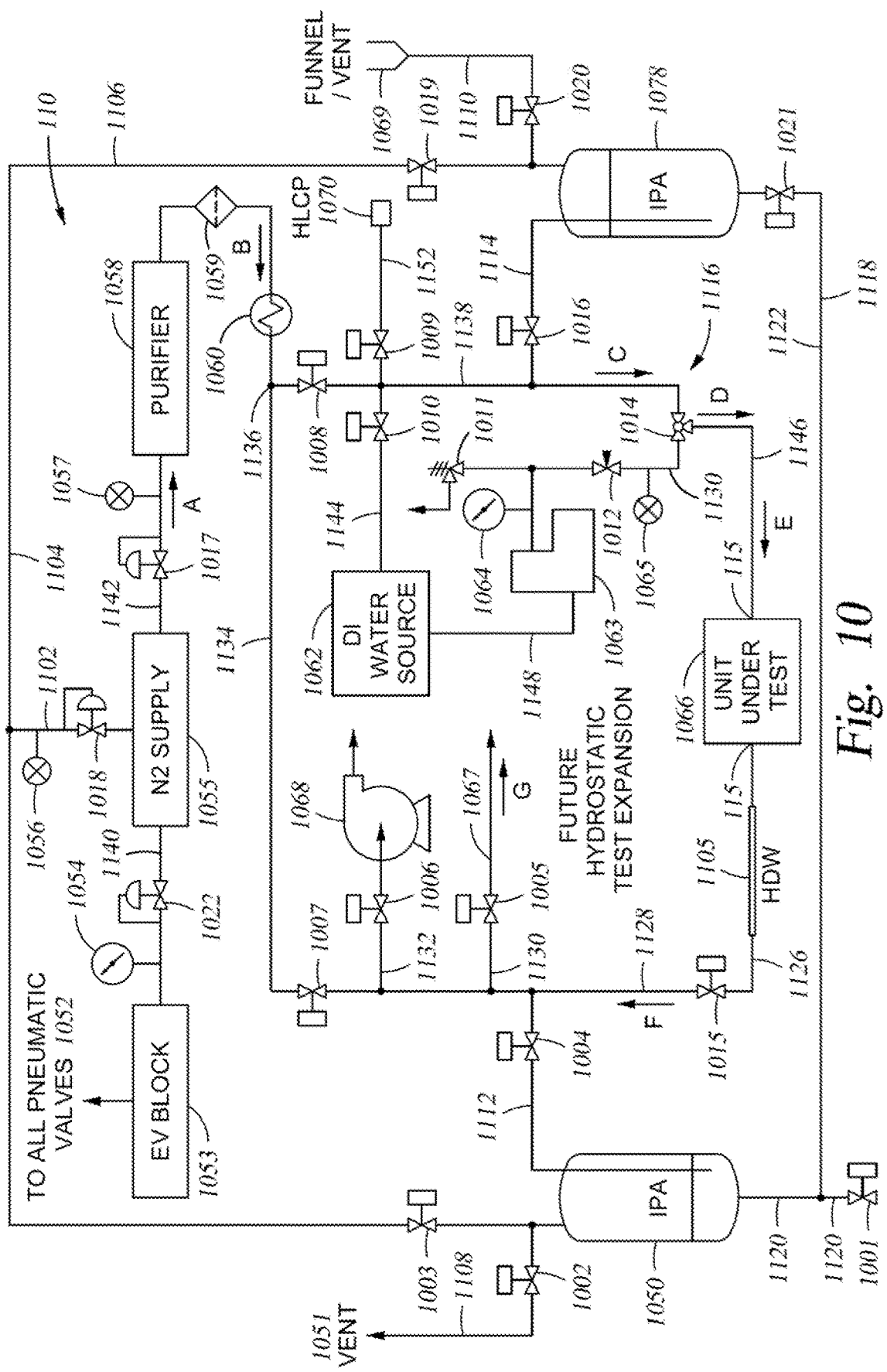
FIG. 10 depicts a configuration of the piping fluid test circuit of FIG. 4 to form a flow path for pushing water from the unit under test, and flushing the unit under test, with nitrogen.
Figure 11:
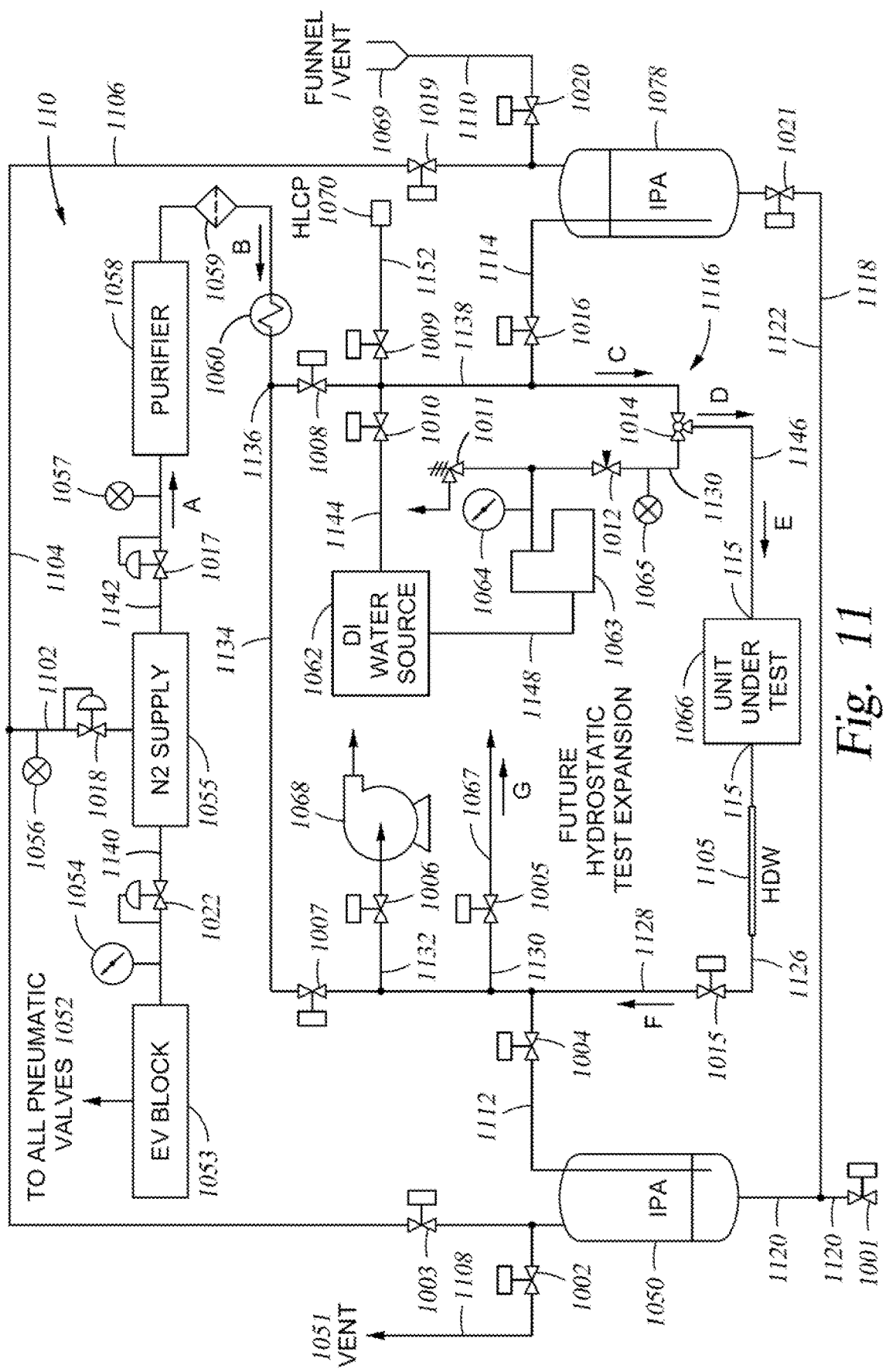
FIG. 11 depicts a configuration of the piping fluid test circuit of FIG. 4 to form a flow path for vacuum drying the unit under test.

Following the conclusion of the DI water flush, the testing unit is again purged with N2 to clean the remaining DI water and any residual IPA out of the testing pipings 110 in the seventh step of the above described eight step process. Again, the computer initiates this procedure by shutting all on-off valves, or assessing each on-off valve for its shut status and shutting any on-off valve that may have opened since the previous action sequence. The computer then directs the EV block to open the second drain valve 1005 and second pneumatic circulation line valve 1008, open the HP ball valve 1015, and set the three way selector ball valve to isolate the high pressure test system 1063 and establish a fluid communication path between the fourth circulation fluid line 1138 and the fifth circulation fluid line 1146. As the nitrogen pressure is regulated at a higher than atmospheric pressure, in this configuration nitrogen will flow from the higher pressure supply at 1055 to the lower pressure drain 1067, pushing the water present in the testing pipings ahead of it. In one aspect, as shown in FIG. 10, this flow is through the second nitrogen branch line 1142 in the direction of arrow A, then through the regulator 1017 and past pressure transducer 1057 in the direction of arrow B, through the purifier 1058, the filter 1059, the N2 heater 1060 and through the second pneumatic circulation line valve 1008 and into the fourth circulation fluid line 1138 in the direction of arrow C. The nitrogen then flows through the three-way selector ball valve 1014, into the fifth circulation flow line 1146, and in the direction of arrow E to flow through the unit under test 1066. The nitrogen then flows, in the direction of arrow F, through the first circulation fluid line 1126 and the second circulation fluid line 1128, and then through the second drain valve 1005 to the drain 1067 in the direction of arrow G.

At the conclusion of the N2 purge, the computer closes all open valves. Following the conclusion of the DI water flush, the unit under test needs to be must be vacuum dried and degassed, i.e., water or water vapor adsorbed or absorbed thereon or into is removed, as the eighth step of the above described eight step process. In this operation, the unit under test 1066 is connected to the rough vacuum pump 1068. The computer initiates this procedure by shutting all on-off valves, or assessing each on-off valve for its shut status and shutting any on-off valve that may have opened since the previous action sequence. The computer then causes the EV block to open the vacuum control line valve 1006, and also opens the HP ball valve 1015. In this configuration of the testing pipings, the interior volumes of only the fifth circulation fluid line 1146, the inner surfaces of the unit under test 1066, the first circulation fluid line 1126, the first circulation branch line, and the second drain line 1130 are exposed to vacuum. The rough vacuum pump 1068 pumps this inner volume to a reduced pressure, causing water vapor in these components or on or in the inner surfaces thereof, to vaporize or boil off under the reduced pressure conditions inside of the unit under test 1066 into the inner volume and be pumped from this component, drying the interior surfaces. After drying, the rough vacuum pump 1068 is turned off, and the second drain valve 1005 can be opened to increase the pressure within the interior of the unit under test 1066 to atmospheric pressure. At this point, the unit under test has been tested, and cleaned, and is ready to be removed from the cabinet and either further inspected, processed into a gas circuit, independently packaged and shipped to a user, set into inventory, or otherwise held or disposed of.

In one aspect hereof, following the conclusion of the pressure testing, the unit under test 1066 is flushed with heated N2 (nitrogen) in the third step of the eight step process, wherein the heated N2 (nitrogen) flush is performed bi-directionally, in other words, the test pipings are configured to flow the heated N2 in a first direction through the unit under test 1066, and then through the unit under test 1066 in a second direction opposite to the first direction. This bidirectional flushing can be performed multiple times, including partial second or third bi directional flushes, where the flushing occurs once more in one of the directions than the other. For example, the flushing may be first direction, second direction, first direction, second direction, in that sequence, in which an integer unit of two bidirectional flushes are performed. Or, it may occur in non-integer incremental units, for example a first direction flush, a second direction flush, and then a first direction flush, for one and one half integer units of bidirectional flush, or for example a first direction flush, a second direction flush, a first direction flush, a second direction flush, a then a first direction flush, for one and one half integer units of bidirectional flush. Any integer number of units of flush is contemplated herein, as desired by the user. As previously, describer, to initiate the first direction N2 flush, the computer initiates this procedure by shutting all on-off valves, or assessing each on-off valve for it is off or shut status and shutting any valve that may have opened since the previous action sequence. The computer then instructs the EV block to open the first pneumatic circulation line valve 1008, and second drain valve 1005. It also positions three-way selector valve 1014 to isolate the pressurized deionized water line and fluidly connect the third circulation fluid line 1038 to the fifth circulation flow line 1146. The computer also opens the HP ball valve 1015. This allows the N2 to flow from the N2 source supply 1055. As shown in FIG. 6, with the valve positions thus set, the N2 flows in the direction of arrow A in the second nitrogen branch line 1142 through regulator 1017 and past pressure transducer 1057 in the direction of arrow B, through the purifier 1058, the filter 1059, the N2 heater 1060 and through the second pneumatic circulation line valve 1008 in the direction of arrow C. The nitrogen, heated by the heater 1060, then flows through the fourth and fifth circulation fluid lines 1138, 1146 and into the unit under test 1066 in the direction of arrow D. It then flows through the second circulation fluid line 1128 in the direction of arrow E and then and through the second drain valve 1005 in the direction of arrow F.

Figure 12:
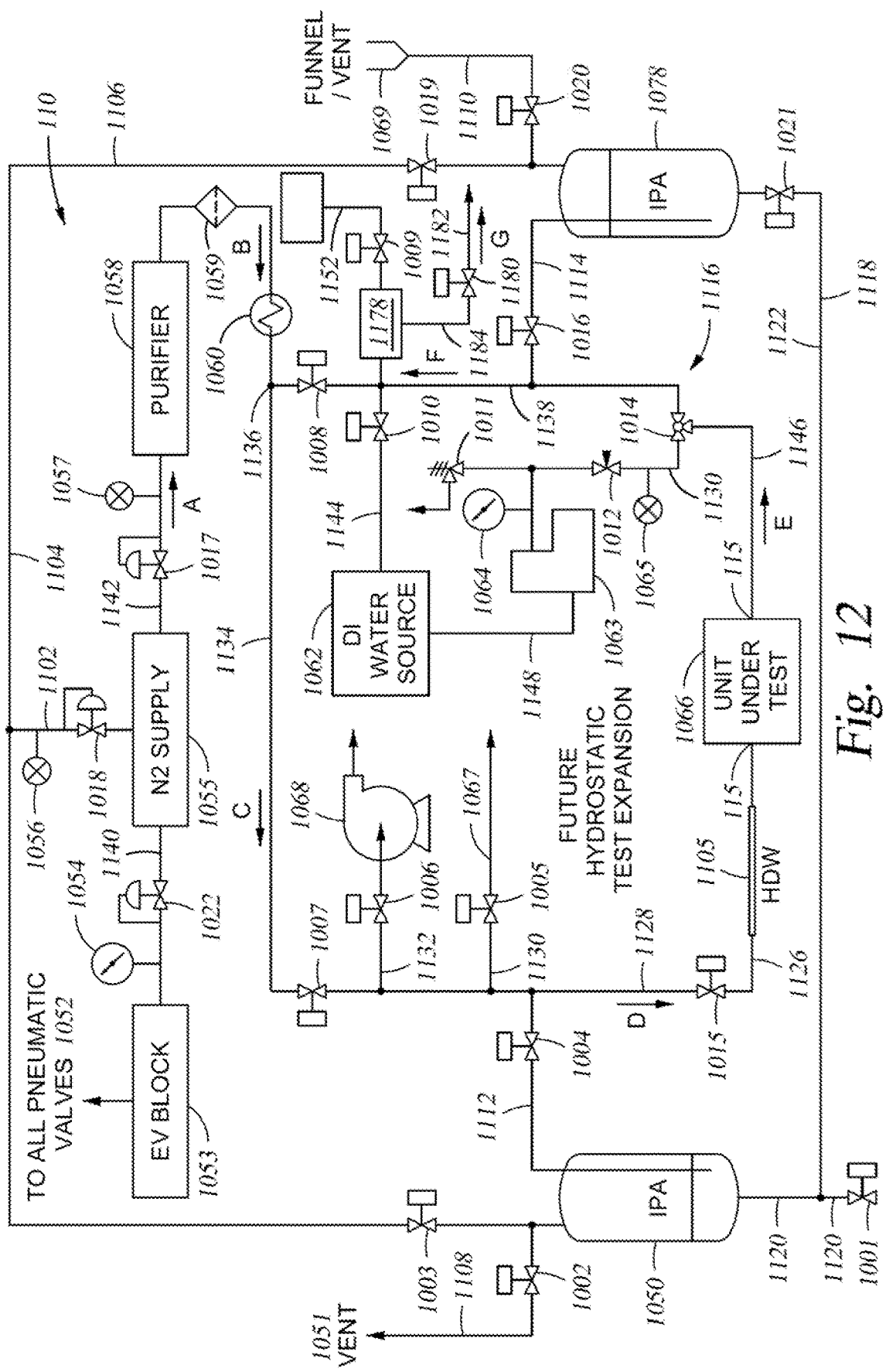
FIG. 12 depicts a configuration of the piping fluid test circuit of FIG. 4 with a modification thereto to enable bi-directional nitrogen flushing or purging of a unit under test.

To initiate the second direction N2 flush, the computer causes the EV block to close second pneumatic circulation line valve 1008, opens first circulation pneumatic line valve 1007, and closes second drain valve 1005. Additionally, here, a manifold line 1176, which opens into a fluid manifold 1178, is fluidly connected to the third circulation fluid line 1138 at a location thereof between the connections of the second pneumatic circulation line valve 1008 and the first IPA flush line 1114 thereto. Here, the helium leak check port line 1152 is connected to the manifold 1178, and thus the third fluid circulation fluid line 1138, through the helium leak check control line valve 1009. Additionally, a secondary vent/drain line 1184 extends from the manifold 1178 to a secondary vent/drain valve 1180, which when opened, exposes the interior volume of the manifold 1178 to the ambient atmosphere, or a house exhaust or drain 1182. During the flowing of the heated N2 in the first direction, a secondary vent/drain valve 1180 and the helium leak check control line valve 1009 are closed to prevent fluid flow therethrough. To enable the heated N2 flow in the second direction, the computer instructs the EV Block 1053 to open the secondary vent/drain valve 1180 and thus expose the interior volume of the manifold 1178 to the ambient atmosphere, or a house exhaust or drain 1182. As a result of this valving configuration, the heated N2 flowing through the N2 heater in direction B s diverted to flow in direction of arrow C in FIG. 12 toward and through the first circulation pneumatic line valve 1007 and then through second circulation fluid line 1128 and first circulation fluid line 1126 in the direction of arrow D (the second direction) and then through the unit under test 1066, the fifth circulation fluid line 1146 and the three way selector ball valve 1014 in the direction of arrow E, The heated N2 continues to flow, in direction of arrow F, through the third fluid circulation line 1138 and into the manifold 1178, and thence through the secondary vent/drain valve 1180 to vent out of the system. By selectively setting the valving to select the flow of the N2 through the unit under test in the first or second directions, the bi-directional flushing is achieved.

As described herein, a system is provided for testing, and subsequently cleaning and drying units under test, with no physical handling of the units under test during or between testing steps, cleaning and drying procedures. This results in less stress and the weldments connecting pipings or tubings, resulting in greater overall reliability of the parts.

What is claimed is:

1. A fluid test circuit with first and second pipe openings positioned to connect a unit under test, comprising a tube having first and second connection portions on the opposed first and second ends, respectively, thereof thereacross, comprising:
    a first nitrogen source line selectively connected to a first IPA tank through a nitrogen selector valve, to selectively exert nitrogen pressure on isopropanol in the first IPA tank;
    a second nitrogen source line selectively connected to a second IPA tank through a second nitrogen selector valve, to selectively exert nitrogen pressure on isopropanol in the second IPA tank;
    the first nitrogen source and second nitrogen source each further including a first subline and a second subline;
    a fluid circuit, comprising a fluid line circulation circuit;
    a first drain selectively connected to the fluid line circulation circuit through a first drain valve;
    a first IPA tank connected to the fluid line circulation circuit through a first IPA line and a first IPA valve, and a second IPA tank connected to the fluid line circulation circuit through a second IPA line and a second IPA valve;
    a second drain connected to the first IPA tank through a first IPA drain valve and the second IPA tank through a second IPA drain valve;
    a first IPA vent connected to the first IPA tank through a first IPA vent valve;
    a second IPA vent connected to the second IPA tank through a second IPA vent valve;
    a first water line selectively connectable to a water source and to the fluid line circulation circuit through a water valve; and
    a vacuum pump selectively connectable to the fluid line circulation circuit through a vacuum selection valve;
    wherein the fluid line circulation circuit is selectively configurable to flow water, nitrogen and IPA through the unit under test.

2. The fluid test circuit of claim 1, wherein the fluid line circulation circuit comprises:
    a first circulation fluid line including a first end and a second end, the first end thereof providing a first pipe opening to fluidly connect to a unit under test;
    a first circulation branch line including a first end and a second end, the first end thereof fluidly connected to the second end of the first circulation fluid line;
    a second circulation fluid line having a first end and a second end, the first end thereof fluidly connected to the second end of the first circulation branch line;
    a third circulation fluid line having a first end and a second end, the first end thereof fluidly connected to the second end of the second circulation fluid line; and
    a fourth circulation fluid line having a first end and a second end, the first end fluidly connected to the second end of the third circulation fluid line and the second end thereof providing a second pipe opening connectable to a unit under test.

3. The fluid test circuit of claim 2, wherein a first fluid sub-circuit comprises a helium leak check source selectively connectable to the third circulation fluid line through a helium leak check control valve, the fourth circulation fluid line, the first circulation fluid line, the first circulation branch line; and a fluid outlet selectively fluidly coupled to the first circulation branch line.

4. The fluid test circuit of claim 3, wherein the fluid outlet comprises helium leak check port.

5. The fluid test circuit of claim 3, wherein a second fluid sub-circuit comprises the first water line, the third circulation fluid line, the fourth circulation fluid line, the first circulation fluid line, the first circulation branch line, and the drain.

6. The fluid test circuit of claim 2, wherein a third fluid sub-circuit comprises:
a second water line connected to the water source;
a high-pressure hydrostatic test system connected to the second water line at a first side thereof and to the fourth circulation fluid line at a second end thereof;
the first circulation fluid line; and
a first circulation fluid valve disposed between, and configured to selectively open or block fluid communication between, the second end of the first circulation fluid line and the first end of the first circulation branch line.

7. The fluid test circuit of claim 2, wherein a fourth fluid sub-circuit comprises;
the first subline;
the third circulation fluid line;
the fourth circulation fluid line;
the first circulation fluid line; and
the first circulation branch line.

8. The fluid circuit of claim 2, wherein a fifth fluid sub-circuit comprises;
the third circulation fluid line;
the fourth circulation fluid line;
the first circulation fluid line;
the first circulation branch line;
the first IPA tank;
a first IPA flush line extending from the first IPA tank to the first circulation branch line;
the second IPA tank; and
a second IPA flush line extending from the first IPA tank to the first circulation branch line.

9. A testing system for testing the fluid integrity of a unit under test including a piping with opposed fittings thereon, comprising:
a cabinet having an internal shelf, a fluid test circuit region on a first side of the internal shelf and a test region on a second side of the internal shelf;
a fluid test circuit with first and second pipes extending from a first side of the internal shelf to a second side of the internal shelf, the open ends thereof distal to the second side of the internal shelf positioned to connect a unit under test thereacross, the unit under test comprising a tube having first and second connection portions on the opposed first and second ends, respectively, thereof, connected thereacross, the fluid test circuit comprising:
a first nitrogen source line selectively connected to a first IPA tank through a nitrogen selector valve, to selectively exert nitrogen pressure on isopropanol in the first IPA tank;
a second nitrogen source line selectively connected to a second IPA tank through a second nitrogen selector valve, to selectively exert nitrogen pressure on isopropanol in the second IPA tank;
the first nitrogen source and second nitrogen source each further including a first subline and a second subline;
a fluid circuit, comprising a fluid line circulation circuit;
a first drain selectively connected to the fluid line circulation circuit through a first drain valve;
a first IPA tank connected to the fluid line circulation circuit through a first IPA line and a first IPA valve, and a second IPA tank connected to the fluid line circulation circuit through a second IPA line and a second IPA valve;
a second drain connected to the first IPA tank through a first IPA drain valve and the second IPA tank through a second IPA drain valve;
a first IPA vent connected to the first IPA tank through a first IPA vent valve;
a second IPA vent connected to the second IPA tank through a second IPA vent valve;
a first water line selectively connectable to a water source and to the fluid line circulation circuit through a water valve; and
a drain selectively connectable to the fluid line circulation circuit through a drain valve;
wherein the fluid line circulation circuit is selectively configurable to flow water, nitrogen and IPA through the unit under test.

10. The fluid test circuit of claim 9, wherein the fluid line circulation circuit comprises:
a first circulation fluid line including a first end and a second end, the first end thereof providing a first pipe opening to fluidly connect to a unit under test;
a first circulation branch line including a first end and a second end, the first end thereof fluidly connected to the second end of the first circulation fluid line;
a second circulation fluid line having a first end and a second end, the first end thereof fluidly connected to the second end of the first circulation branch line;
a third circulation fluid line having a first end and a second end, the first end thereof fluidly connected to the second end of the second circulation fluid line; and
a fourth circulation fluid line having a first end and a second end, the first end fluidly connected to the second end of the third circulation fluid line and the second end thereof providing a second pipe opening connectable to a unit under test.

11. The fluid test circuit of claim 10, wherein a first fluid sub-circuit comprises a nitrogen source selectively connectable to the third circulation fluid line through a nitrogen control valve, the fourth circulation fluid line, the first circulation fluid line, the first circulation branch line; and a fluid outlet selectively fluidly coupled to the first circulation branch line.

12. The fluid test circuit of claim 11, wherein the fluid outlet comprises of the first drain.

13. The fluid test circuit of claim 11, wherein a second fluid sub-circuit comprises the first water line, the third circulation fluid line, the fourth circulation fluid line, the first circulation fluid line, the first circulation branch line, and the drain.

14. The fluid test circuit of claim 10, wherein a third sub-circuit comprises:
a second water line connected to the water source;

a high-pressure hydrostatic test system connected to the second water line at a first side thereof and to the fourth circulation fluid line at a second end thereof;

the first circulation fluid line; and a first circulation fluid valve disposed between, and configured to selectively open or block fluid communication between, the second end of the first circulation fluid line and the first end of the first circulation branch line.

15. The fluid test circuit of claim 10, wherein a fourth fluid sub-circuit comprises:

the first subline;

the third circulation fluid line;

the fourth circulation fluid line;

the first circulation fluid line;

the first circulation branch line;

and the drain.

16. The fluid circuit of claim 10, wherein a fifth fluid sub-circuit comprises:

the third circulation fluid line;

the fourth circulation fluid line;

the first circulation fluid line;

the first circulation branch line;

the first IPA tank;

a first IPA flush line extending from the first IPA tank to the first circulation branch line;

the second IPA tank; and a second IPA flush line extending from the first IPA tank to the first circulation branch line.

\* \* \* \* \*